United States Patent
Ueda et al.

(10) Patent No.: US 10,662,358 B2
(45) Date of Patent: May 26, 2020

(54) HEAT STORAGE MATERIAL COMPOSITION, HEAT STORAGE MATERIAL AND TRANSPORT CONTAINER

(71) Applicants: KANEKA CORPORATION, Osaka-shi, Osaka (JP); TAMAIKASEI CO., LTD., Otaru-shi, Hokkaido (JP)

(72) Inventors: Toru Ueda, Settsu (JP); Keiji Sato, Otaru (JP)

(73) Assignees: KANEKA CORPORATION, Osaka-Shi (JP); TAMAIKASEI CO., LTD., Otaru-Shi (JP)

(*) Notice: Subject to any disclaimer, the term of this patent is extended or adjusted under 35 U.S.C. 154(b) by 503 days.

(21) Appl. No.: 14/649,657

(22) PCT Filed: Dec. 10, 2013

(86) PCT No.: PCT/JP2013/083115
§ 371 (c)(1),
(2) Date: Jun. 4, 2015

(87) PCT Pub. No.: WO2014/092093
PCT Pub. Date: Jun. 19, 2014

(65) Prior Publication Data
US 2015/0299549 A1    Oct. 22, 2015

(30) Foreign Application Priority Data

Dec. 11, 2012 (JP) ................................. 2012-270781

(51) Int. Cl.
*B65D 81/38* (2006.01)
*C09K 5/06* (2006.01)
*F28D 20/02* (2006.01)

(52) U.S. Cl.
CPC .......... *C09K 5/063* (2013.01); *B65D 81/3813* (2013.01); *F28D 20/02* (2013.01); *Y02E 60/145* (2013.01)

(58) Field of Classification Search
CPC ................ B65D 81/3813; C09K 5/063; C09K 2205/102; C09K 21/02; C09K 5/02;
(Continued)

(56) References Cited

U.S. PATENT DOCUMENTS 4,100,092 A * 7/1978 Spauschus ............. C09K 5/063
  165/10
5,339,796 A * 8/1994 Manker .................... A61F 7/03
  126/263.03
(Continued)

FOREIGN PATENT DOCUMENTS

JP    5-237368 A    9/1993
JP    6-17042 A    1/1994
(Continued)

OTHER PUBLICATIONS

UniversityChemistryCo_Wax_NPL (Year: 2018).*
(Continued)

*Primary Examiner* — Elizabeth A Robinson
*Assistant Examiner* — Julius Fitzhugh
(74) *Attorney, Agent, or Firm* — Birch, Stewart, Kolasch & Birch, LLP

(57) ABSTRACT

A heat storage material composition having a melting temperature utilized for control of an optional management temperature, providing no variation in melting behavior and solidification behavior, and having a constant melting temperature. The heat storage material composition consists primarily of a mixture of a higher alkane having carbon number of 9 to 24 and a higher alcohol having carbon number of 6 to 20, and the mixture has a substantially single
(Continued)

Lauryl Alcohol (c) : 85.0 mol%
Octadecane (b) : 15.0 mol%
+ Gelling Agent melting peak in DSC curve measured by a differential scanning calorimeter (DSC).

10 Claims, 17 Drawing Sheets

(58) Field of Classification Search
CPC .... C09K 5/14; C09K 5/10; C09K 5/06; F28D 20/02; F28D 20/023; F28D 2020/0004; F28D 2020/0008; F28D 20/0056; F28D 20/025; F28D 20/028; F28D 20/021; F28D 20/0034; F28D 2020/0026; F28D 2021/0061; F28D 20/026; Y02E 60/145; Y02E 60/147; Y02E 60/142; C08J 9/00; C08J 9/0009; C08L 91/06; C08K 5/01; A41D 13/005; B32B 2439/80
USPC .......... 392/339; 252/71, 73, 67, 70; 165/10, 165/104.17, 902, 104.11, 104.15, 104.13, 165/61, 920; 428/31.4; 106/802; 126/618, 617; 585/9; 604/291
See application file for complete search history.

(56) References Cited

U.S. PATENT DOCUMENTS

| | | | |
|---|---|---|---|
| 5,453,213 A * | 9/1995 | Kakiuchi | C09K 5/063 165/10 |
| 5,456,852 A | 10/1995 | Isiguro | |
| 5,718,835 A | 2/1998 | Momose et al. | |
| 5,916,478 A | 6/1999 | Nakahira et al. | |
| 6,200,681 B1 * | 3/2001 | Jahns | B01J 13/14 428/402.21 |
| 7,919,163 B2 * | 4/2011 | Romero | F16L 59/026 126/618 |
| 2004/0046147 A1 * | 3/2004 | Matsuda | C09K 5/063 252/70 |
| 2006/0000232 A1 | 1/2006 | Bureau et al. | |
| 2007/0248824 A1 | 10/2007 | Lang-Wittkowski et al. | |
| 2009/0199994 A1 * | 8/2009 | Amano | C09K 5/063 165/10 |

FOREIGN PATENT DOCUMENTS

| | | |
|---|---|---|
| JP | 9-31451 A | 2/1997 |
| JP | 2003-311118 A | 11/2003 |
| JP | 2004-143229 A | 5/2004 |
| JP | 2006-502903 A | 1/2006 |
| JP | 2007-31685 A | 2/2007 |

OTHER PUBLICATIONS

Wei. et. al. (Wei, Dongwei, et al. "Solid-Liquid Phase Equilibrium Study of n-Octadecane+Lauryl Alcohol Binary Mixtures." The Journal of Chemical Thermodynamics, vol. 60, 2013, pp. 94-97., (Year: 2013).*
International Search Report, issued in PCT/JP2013/083115, dated Mar. 18, 2014.
Ai Mingxing, "The Study of Phase Change Materials on Storing Energy" Thesis, Mar. 2003, 98 Pages (with English Abstract).
Office Action dated Apr. 20, 2017 in Chinese Patent Application 201380064328.3.
Xing-xiang Zhang, et al., "Crystallization and prevention of supercooling of microencapsulated n-alkanes" Journal of Colloid and Interface Science, 2005, vol. 281, pp. 299-306.
Yongsheng Yu, "Preparation and Application of Phase Change Energy Storage Composite Materials based on Expanded Perlite" May 2011, 76 Pages (with English Abstract).

* cited by examiner

Lauryl Alcohol (a) : 89.8 mol%
Octadecane (b) : 10.2 mol%

Lauryl Alcohol (a) : 85.1 mol%
Octadecane (b) : 14.9 mol%

Lauryl Alcohol (a) : 80.0 mol%
Octadecane (b) : 20.0 mol%

Lauryl Alcohol (a) : 74.9 mol%
Octadecane (b) : 25.1 mol%

Lauryl Alcohol (a) : 70.0 mol%
Octadecane (b) : 30.0 mol%

Lauryl Alcohol (a) : 64.9 mol%
Octadecane (b) : 35.1 mol%

Lauryl Alcohol (a) : 59.9 mol%
Octadecane (b) : 40.1 mol%

Lauryl Alcohol (a) : 49.9 mol%
Octadecane (b) : 50.1 mol%

Lauryl Alcohol (a) : 39.9 mol%
Octadecane (b) : 60.1 mol%

Lauryl Alcohol (a) : 20.0 mol%
Octadecane (b) : 80.0 mol%

Lauryl Alcohol (c) : 85.1 mol%
Octadecane (b) : 14.9 mol%

Lauryl Alcohol (d) : 85.1 mol%
Octadecane (b) : 14.9 mol%

Lauryl Alcohol (c) : 85.1 mol%
Octadecane (e) : 14.9 mol%

Lauryl Alcohol (d) : 85.1 mol%
Octadecane (e) : 14.9 mol%

Lauryl Alcohol (a) : 100 mol%

Lauryl Alcohol (c) : 100 mol%

Lauryl Alcohol (a) : 80.0 mol%
Lauric Acid : 20.0 mol%
+ Gelling Agent

Lauryl Alcohol (c) : 80.0 mol%
Lauric Acid : 20.0 mol%
+ Gelling Agent

Lauric Acid : 100 mol%

1-decanol (f) : 94.1 mol%
n-hexadecane (g) : 5.9 mol%

1-decanol (f) : 90.1 mol%
n-hexadecane (g) : 9.9 mol%

1-decanol (f) : 85.0 mol%
n-hexadecane (g) : 15.0 mol%

1-decanol (f) : 80.0 mol%
n-hexadecane (g) : 20.0 mol%

1-decanol (f) : 70.0 mol%
n-hexadecane (g) : 30.0 mol%

1-decanol (f) : 60.0 mol%
n-hexadecane (g) : 40.0 mol%

1-decanol (f) : 50.0 mol%
n-hexadecane (g) : 50.0 mol%

1-decanol (f) : 40.0 mol%
n-hexadecane (g) : 60.0 mol%

1-decanol (f) : 19.3 mol%
n-hexadecane (g) : 80.7 mol%

1-decanol (h) : 90.1 mol%
n-hexadecane (g) : 9.9 mol%

1-decanol (f) : 90.1 mol%
n-hexadecane (i) : 9.9 mol%

1-decanol (h) : 90.1 mol%
n-hexadecane (i) : 9.9 mol%

1-decanol (f) : 100 mol%

(a)

(b)

HEAT STORAGE MATERIAL COMPOSITION, HEAT STORAGE MATERIAL AND TRANSPORT CONTAINER

TECHNICAL FIELD

The present invention relates to a heat storage material composition for managing temperature of articles, to a heat storage material using the composition, and to a constant temperature transport container provided with the heat storage material. More specifically, the present invention relates to a heat storage material composition, a heat storage material and a transport container, used to house or transport various articles such as drug medicine, medical device, specimen, organ, chemical compound or food with keeping their temperature within a predetermined temperature range.

BACKGROUND ART

Some articles of drug medicines or specimens handled in medical institutions such as hospitals and of foods handled in supermarkets need during their transportation to keep cold or warm within a predetermined temperature range in order to maintain their quality. As a conventional method of keeping cold or warm with the articles such as drug medicines, specimens or foods, there is a method of housing the articles in a heat-insulation transport container, in which a solidified or molten heat storage materials are accommodated beforehand to use this melting latent heat. In order to maintain for a long time the temperature of articles to be kept cold or warm (hereinafter called as "temperature-regulation required articles") within a predetermined temperature rage (hereinafter called as "regulated temperature range"), it is necessary to utilize a heat storage material or heat storage materials having a melting temperature in a predetermined temperature range and a large melting latent heat.

The conventional cheap and safe heat storage material generally used and with a large melting latent heat is composed mainly of water. As is known, the melting temperature of water is in general around 0° C. If it is necessary to manage the temperature of the articles at the regulated temperature range of 0° C. or less, a freezing point depressant may be added to the water to adjust the melting temperature thereof below 0° C. However, in case that it is necessary to manage the temperature of the articles at the regulated temperature range of more than 0° C., such heat storage material composed mainly of water cannot be used. Concrete examples of the regulated temperature range of the articles over 0° C. are as follows. The appropriate regulated temperature range in transportation of blood and blood plasma is substantially about 4-6° C., the appropriate regulated temperature range in transportation of drugs is substantially abut 2-8° C., and the appropriate regulated temperature range in transportation of blood platelet and biological organization is substantially about 18-22° C.

Heat storage material compositions suitable for the regulated temperature range of more than 0° C. have been developed for a long time and really used. For example, in patent document 1, disclosed is an apparatus for thermally packaging an item or temperature-regulation required article. The apparatus includes at least one container substantially filled with phase change (transition) alcohol. The alcohol used in the apparatus of this patent document 1 is an alcohol of C6-C20, particularly a higher alcohol such as 1-decanol or 1-dodecanol. Namely, this patent document 1 discloses technique for keeping the temperature in the heat storage material vessel constant by utilizing transition of phase of the alcohol so as to substantially prevent temperature change in the apparatus.

Patent document 2 discloses a heat storage material composition consisting of (a) sodium sulfate decahydrate: 60-85 parts by weight (pts·wt.) and (b) inorganic salt such as ammonium chloride: 15-40 pts·wt., and containing cross-linked carboxymethylcellulose of 0.1-10 pts·wt. per 100 pts·wt. of heat storage component having melting temperature of 5-15° C. Namely, this patent document 2 discloses a heat storage material composition suitable for cooling air conditioning, by utilizing the sodium sulfate decahydrate with a high latent heat capacity, so as to have property of little falls in latent heat capacity even if it is repeatedly used for a long period of time and also property of small difference between the solidification temperature and the melting temperature.

On the other hand, patent document 3 discloses a heat storage material composition used for maintaining temperature principally higher than the normal temperature. This heat storage material composition is composed of at least one selected from a group consisting of a higher fatty acid having carbon number of 10 or more and a higher alcohol having carbon number of 10 or more, and a hydrous water absorptivity polymer. Namely, this patent document 3 discloses a heat storage material in solid state to be hard to catch fire, having a relatively high melting temperature and a high latent heat capacity by impregnating the above-mentioned higher fatty acid and/or higher alcohol in a hydrous held water absorptive polymer.

PRIOR ART DOCUMENTS

Patent Documents

Patent document 1: Japanese patent application publication (Translation of PCT application) 2007-501925A, Patent document 2: Japanese patent publication H10-330741A, and Patent document 3: Japanese patent publication H08-100171A.

DISCLOSURE OF THE INVENTION

Problem to be Solved by the Invention

However, none of the conventional heat storage material compositions disclosed in these patent documents could sufficiently set an optional management temperature within the above-mentioned range of more than 0° C., that is, within a range from the nearly melting temperature of water to the nearly normal temperature, and to maintain this management temperature. According to the heat storage material disclosed in patent document 1, for example, alcohol was used for controlling the temperature. However, when a single material such as alcohol alone was used as the heat storage material composition for controlling the temperature, it was difficult to arbitrarily adjust the management temperature. Namely, the heat storage material utilized phenomenon for holding the temperature of the heat storage material composition near its melting temperature from the solid state to the liquid state, and thus if a single material was used as the heat storage material composition, it was impossible to set the management temperature other than the inherent melting temperature of the heat storage material composition and thus the management temperature to be set was limited. Also, according to the study of the inventors of this application, revealed was that the melting temperature and the solidification temperature of the heat storage material composition containing the higher alcohol with the melting temperature available for control of the above-mentioned management temperature were not constant but varied. For example, in case that the melting temperature and the solidification temperature of the heat storage material composition containing such the higher alcohol were measured with the differential scanning calorimeter (DSC), the measured melting temperatures might sometimes differ with each other depending upon the production lots of the composition even though the same higher alcohol was composed therein, and also, a plurality of melting peaks and solidification peaks that might be used as indexes of the melting temperature and the solidification temperature were found in the DSC curve. This is partly because the higher alcohol might take a plurality of crystal structures and the existence ratio of the plurality of crystal structures may widely vary under the influence of impurities or environment change, and thus the melting behavior or the solidification behavior of the DSC curve might become unstable. Therefore, according to the heat storage material disclosed in patent document 1, it was difficult to arbitrarily adjust the management temperature and also difficult to obtain stable melting temperature or stable solidification temperature even if the higher alcohol with the melting temperature that could be used for control of the management temperature was used. Thus, this heat storage material was unsuitable for the temperature management in a narrow range demanded from the safekeeping of pharmaceutical products or specimen.

The heat storage material composition disclosed in patent document 2 was capable of adjusting the melting temperature by adding and mixing a plurality of inorganic materials. However, according to this heat storage material component, since the melting latent heat capacity decreased with respect to that when a single material was used, it was impossible to obtain enough performance for maintaining the temperature near the melting temperature. Also, such the heat storage material composition fabricated by mixing a plurality of materials had a problem that its performance might deteriorate due to heat histories such as heat cycle examination.

The heat storage material composition disclosed in patent document 3 was capable of providing a high melting temperature and a high latent heat capacity by using the higher fatty acid and the higher alcohol. The inventors of this application were tried to obtain the heat storage material composition with the melting temperature available for control of the above-mentioned management temperature within a range from the nearly melting temperature of water to the nearly body temperature by adjusting the composition ratio of the higher fatty acid and the higher alcohol in the heat storage material composition. However, melting behavior and solidification behavior of materials such as the higher fatty acid and the higher alcohol greatly differed with each other depending upon the production lots of the materials even if they had the same ingredient, and thus the melting peak and the solidification peak of the DSC measurement of the heat storage material composition produced by mixing these materials also differed with each other depending upon the production lot of each ingredient. Therefore, the melting behavior and the solidification behavior of this heat storage material composition varied widely and a constant melting temperature was not provided stably. As a result, it was difficult to set the melting temperature of the heat storage material composition at a desired value and also to provide stable temperature management using this melting temperature.

It is therefore an object of the present invention to provide a heat storage material composition having a melting temperature utilized for control of an optional management temperature, providing no variation in melting behavior and solidification behavior, and having a constant melting temperature.

Another object of the present invention is to provide a heat storage material composition enabling stable temperature management and having enough latent heat at the objective management temperature.

Means to Solve the Problem

According to the present invention, a heat storage material composition consists primarily of a mixture of a higher alkane having carbon number of 9 to 24 and a higher alcohol having carbon number of 6 to 20. The mixture has a substantially single melting peak in DSC curve measured by a differential scanning calorimeter (DSC).

By selecting each of higher alkane having carbon number of 9 to 24 and higher alcohol having carbon number of 6 to 20 and by mixing them with a predetermined ratio, it is possible to considerably decrease variations of the melting/solidification behavior existing in each of the higher alkane and the higher alcohol alone. Thus, according to the present invention, a heat storage material composition stably having a constant melting temperature can be obtained. Also, by mixing the higher alkane and the higher alcohol with the predetermined ratio, it is possible to adjust the melting temperature and the solidification temperature with maintaining the inherent high latent heat capacity of the higher alkane and the higher alcohol. Therefore, the melting temperature can be arbitrarily adjusted at a management temperature, which is appropriate for managing goods such as drug medicine, specimen and food, and is in a range from the melting temperature of the water to the room temperature and the body temperature. DSC curve measured by a differential scanning calorimeter (DSC) according to the present invention denotes a chart or a spectrum obtained by DSC measurement about the heat storage material. Also, a melting peak according to the present invention denotes a peak top of a melting peak of the melting behavior obtained from the DSC curve. Furthermore, a single melting peak according to the present invention denotes a main melting peak having at least peak area of 90% or more.

Also, the heat storage material composition according to the present invention preferably consists primarily of a mixture of a higher alkane having carbon number of 18 and a higher alcohol having carbon number of 12. Thus, the preferred combination of higher alkane and higher alcohol capable of obtaining a heat storage material composition with a melting temperature of 20-22° C. can be selected.

According to the heat storage material composition of the present invention, a molar fraction of the higher alcohol having carbon number of 12 in the mixture of the higher alkane having carbon number of 18 and the higher alcohol of C12 is preferably 65-89 mol %. Thus, it is possible to approach or conform the melting peak temperature in DSC curve derived from the higher alkane having carbon number of 18 and the melting peak temperature in DSC curve derived from the higher alcohol having carbon number of 12 to each other, and to obtain a heat storage material composition showing a substantially constant melting peak temperature and a stable melting temperature.

Also, the heat storage material composition according to the present invention preferably consists primarily of a mixture of a higher alkane having carbon number of 16 and a higher alcohol having carbon number of 10. Thus, the preferred combination of higher alkane and higher alcohol capable of obtaining a heat storage material composition with a melting temperature of 4-6° C. can be selected.

According to the heat storage material composition of the present invention, a molar fraction of the higher alcohol having carbon number of 10 in the mixture of the higher alkane having carbon number of 16 and the higher alcohol having carbon number of 10 is preferably 85-94 mol %. Thus, it is possible to approach or conform the melting peak temperature in DSC curve derived from the higher alkane having carbon number of 16 and the melting peak temperature in DSC curve derived from the higher alcohol having carbon number of 10 to each other, and to obtain a heat storage material composition showing a substantially constant melting peak temperature and a stable melting temperature.

Also, the heat storage material composition according to the present invention preferably consists primarily of a mixture of a higher alkane having carbon number of 16 and a higher alcohol having carbon number of 12. Thus, the preferred combination of higher alkane and higher alcohol capable of obtaining a heat storage material composition with a melting temperature of 15-18° C. can be selected.

According to the heat storage material composition of the present invention, a molar fraction of the higher alcohol having carbon number of 12 in the mixture of the higher alkane having carbon number of 16 and the higher alcohol having carbon number of 12 is preferably 21-60 mol %. Thus, it is possible to approach or conform the melting peak temperature in DSC curve derived from the higher alkane having carbon number of 16 and the melting peak temperature in DSC curve derived from the higher alcohol having carbon number of 12 to each other, and to obtain a heat storage material composition showing a substantially constant melting peak temperature and a stable melting temperature.

Also, the heat storage material composition according to the present invention preferably consists primarily of a mixture of a higher alkane having carbon number of 15 and a higher alcohol having carbon number of 12. Thus, the preferred combination of higher alkane and higher alcohol capable of obtaining a heat storage material composition with a melting temperature of 9-11° C. can be selected.

According to the heat storage material composition of the present invention, a molar fraction of the higher alcohol having carbon number of 12 in the mixture of the higher alkane having carbon number of 15 and the higher alcohol having carbon number of 12 is preferably 10-30 mol %. Thus, it is possible to approach or conform the melting peak temperature in DSC curve derived from the higher alkane having carbon number of 15 and the melting peak temperature in DSC curve derived from the higher alcohol having carbon number of 12 to each other, and to obtain a heat storage material composition showing a substantially constant melting peak temperature and a stable melting temperature.

Also, the heat storage material composition according to the present invention preferably consists primarily of a mixture of a higher alkane having carbon number of 14 and a higher alcohol having carbon number of 12. Thus, the preferred combination of higher alkane and higher alcohol capable of obtaining a heat storage material composition with a melting temperature of 6-8° C. can be selected.

According to the heat storage material composition of the present invention, a molar fraction of the higher alcohol having carbon number of 12 in the mixture of the higher alkane having carbon number of 14 and the higher alcohol having carbon number of 12 is preferably 10-30 mol %. Thus, it is possible to approach or conform the melting peak temperature in DSC curve derived from the higher alkane having carbon number of 14 and the melting peak temperature in DSC curve derived from the higher alcohol having carbon number of 12 to each other, and to obtain a heat storage material composition showing a substantially constant melting peak temperature and a stable melting temperature.

Also, the heat storage material composition according to the present invention preferably consists primarily of a mixture of a higher alkane having carbon number of 14 and a higher alcohol having carbon number of 10. Thus, the preferred combination of higher alkane and higher alcohol capable of obtaining a heat storage material composition with a melting temperature of 0-3° C. can be selected.

According to the heat storage material composition of the present invention, a molar fraction of the higher alcohol having carbon number of 10 in the mixture of the higher alkane having carbon number of 14 and the higher alcohol having carbon number of 10 is preferably 50-80 mol %. Thus, it is possible to approach or conform the melting peak temperature in DSC curve derived from the higher alkane having carbon number of 14 and the melting peak temperature in DSC curve derived from the higher alcohol having carbon number of 10 to each other, and to obtain a heat storage material composition showing a substantially constant melting peak temperature and a stable melting temperature.

Also, the heat storage material composition according to the present invention preferably consists primarily of a mixture of a higher alkane having carbon number of 18 and a higher alcohol having carbon number of 14. Thus, the preferred combination of higher alkane and higher alcohol capable of obtaining a heat storage material composition with a melting temperature of 26-28° C. can be selected.

According to the heat storage material composition of the present invention, a molar fraction of the higher alcohol having carbon number of 14 in the mixture of the higher alkane having carbon number of 18 and the higher alcohol having carbon number of 14 is preferably 10-40 mol %. Thus, it is possible to approach or conform the melting peak temperature in DSC curve derived from the higher alkane having carbon number of 18 and the melting peak temperature in DSC curve derived from the higher alcohol having carbon number of 14 to each other, and to obtain a heat storage material composition showing a substantially constant melting peak temperature and a stable melting temperature.

Also, the heat storage material composition according to the present invention preferably consists primarily of a mixture of a higher alkane having carbon number of 20 and a higher alcohol having carbon number of 14. Thus, the preferred combination of higher alkane and higher alcohol capable of obtaining a heat storage material composition with a melting temperature of 30-33° C. can be selected.

According to the heat storage material composition of the present invention, a molar fraction of the higher alcohol having carbon number of 14 in the mixture of the higher alkane having carbon number of 20 and the higher alcohol having carbon number of 14 is preferably 40-70 mol %. Thus, it is possible to approach or conform the melting peak temperature in DSC curve derived from the higher alkane having carbon number of 20 and the melting peak temperature in DSC curve derived from the higher alcohol having carbon number of 14 to each other, and to obtain a heat storage material composition showing a substantially constant melting peak temperature and a stable melting temperature.

Also, the heat storage material composition according to the present invention preferably consists primarily of a mixture of a higher alkane having carbon number of 22 and a higher alcohol having carbon number of 14. Thus, the preferred combination of higher alkane and higher alcohol capable of obtaining a heat storage material composition with a melting temperature of 34-37° C. can be selected.

According to the heat storage material composition of the present invention, a molar fraction of the higher alcohol having carbon number of 14 in the mixture of the higher alkane having carbon number of 22 and the higher alcohol having carbon number of 14 is preferably 73-95 mol %. Thus, it is possible to approach or conform the melting peak temperature in DSC curve derived from the higher alkane having carbon number of 22 and the melting peak temperature in DSC curve derived from the higher alcohol having carbon number of 14 to each other, and to obtain a heat storage material composition showing a substantially constant melting peak temperature and a stable melting temperature.

Also, the heat storage material composition according to the present invention preferably consists primarily of a mixture of a higher alkane having carbon number of 20 and a higher alcohol having carbon number of 16. Thus, the preferred combination of higher alkane and higher alcohol capable of obtaining a heat storage material composition with a melting temperature of 34-38° C. can be selected.

According to the heat storage material composition of the present invention, a molar fraction of the higher alcohol having carbon number of 16 in the mixture of the higher alkane having carbon number of 20 and the higher alcohol having carbon number of 16 is preferably 10-29 mol %. Thus, it is possible to approach or conform the melting peak temperature in DSC curve derived from the higher alkane having carbon number of 20 and the melting peak temperature in DSC curve derived from the higher alcohol having carbon number of 16 to each other, and to obtain a heat storage material composition showing a substantially constant melting peak temperature and a stable melting temperature.

Also, the heat storage material composition according to the present invention preferably consists primarily of a mixture of a higher alkane having carbon number of 22 and a higher alcohol having carbon number of 16. Thus, the preferred combination of higher alkane and higher alcohol capable of obtaining a heat storage material composition with a melting temperature of 41-44° C. can be selected.

According to the heat storage material composition of the present invention, a molar fraction of the higher alcohol having carbon number of 16 in the mixture of the higher alkane having carbon number of 22 and the higher alcohol having carbon number of 16 is preferably 40-60 mol %. Thus, it is possible to approach or conform the melting peak temperature in DSC curve derived from the higher alkane having carbon number of 22 and the melting peak temperature in DSC curve derived from the higher alcohol having carbon number of 16 to each other, and to obtain a heat storage material composition showing a substantially constant melting peak temperature and a stable melting temperature.

Also, the heat storage material composition according to the present invention further contains a hydroxypropyl cellulose. Thus, the mixture of higher alkane and higher alcohol gelates and becomes in a coagulation state, resulting that handling of the heat storage material composition becomes easy and its inflammability or ignition characteristics can be reduced.

Also, the heat storage material according to the present invention includes any one of the above-mentioned heat storage material compositions. Thus, it is possible to provide a heat storage material showing stable melting temperature and high latent heat capacity.

Also, the transport container according to the present invention includes an insulation box and the above-mentioned heat storage material arranged in the insulation box. Thus, it is possible to provide a transport container enabling stable temperature management.

Effect of the Invention

According to the present invention, by selecting each of higher alkane having carbon number of 9 to 24 and higher alcohol having carbon number of 6 to 20 and by mixing them with a predetermined ratio, it is possible to considerably decrease variations of the melting/solidification behavior existing in each of the higher alkane and the higher alcohol alone. Thus, according to the present invention, a heat storage material composition having substantially single melting peak and/or solidification peak in DSC curve, and a constant melting temperature can be obtained. Also, by mixing the higher alkane and the higher alcohol with the predetermined ratio, it is possible to adjust the melting temperature in a range from the melting temperature of the water to the room temperature and the body temperature with maintaining the inherent high latent heat capacity of the higher alkane and the higher alcohol alone. Therefore, it is possible to obtain a heat storage material appropriate for managing temperature sensitive goods such as drug medicine, specimen or food.

EMBODIMENTS FOR CARRYING OUT THE INVENTION

Figure 1:
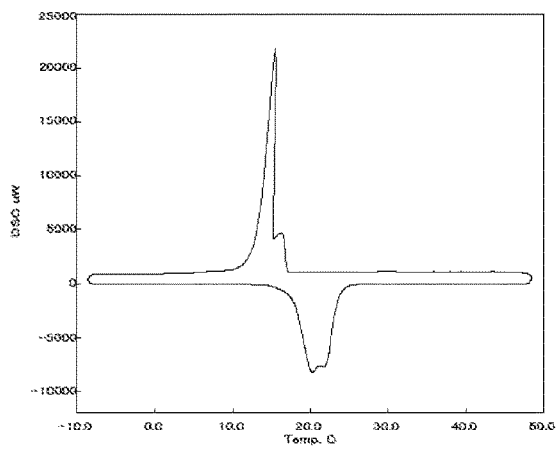
FIG. 1 is a graph of the differential scanning calorimetry result of sample 1-1 in Example 1.
Figure 2:
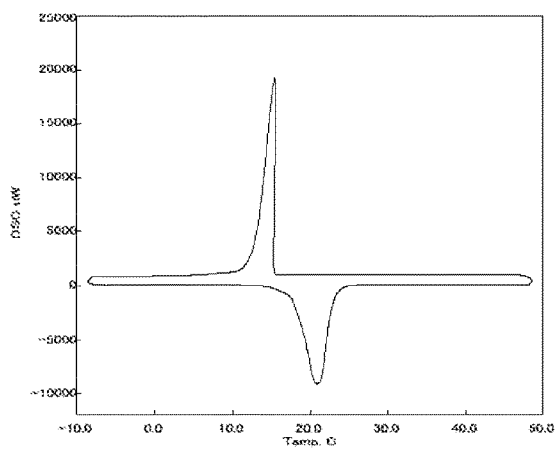
FIG. 2 is a graph of the differential scanning calorimetry result of sample 1-2 in Example 1.
Figure 3:
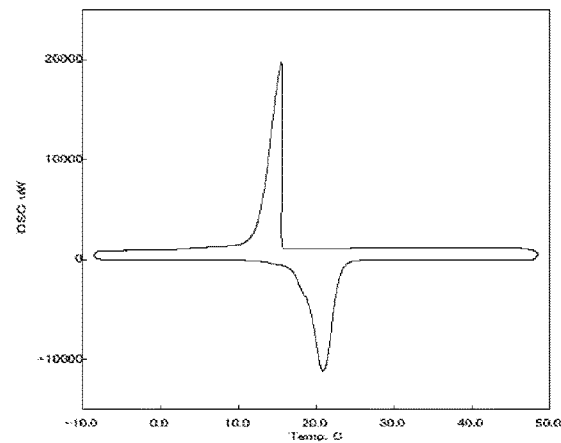
FIG. 3 is a graph of the differential scanning calorimetry result of sample 1-3 in Example 1.
Figure 4:
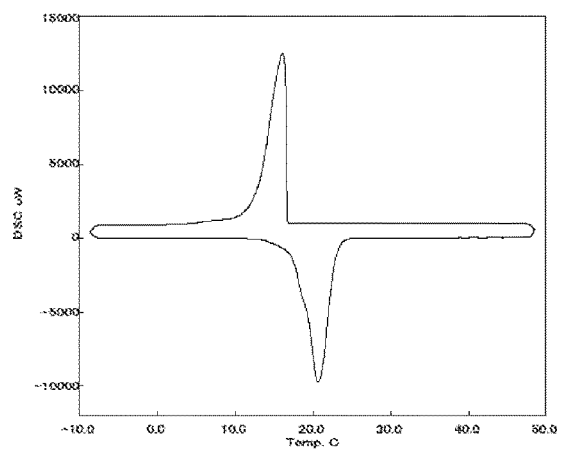
FIG. 4 is a graph of the differential scanning calorimetry result of sample 1-4 in Example 1.
Figure 5:
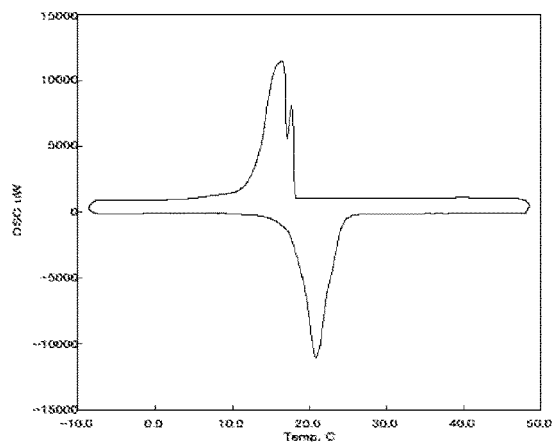
FIG. 5 is a graph of the differential scanning calorimetry result of sample 1-5 in Example 1.
Figure 6:
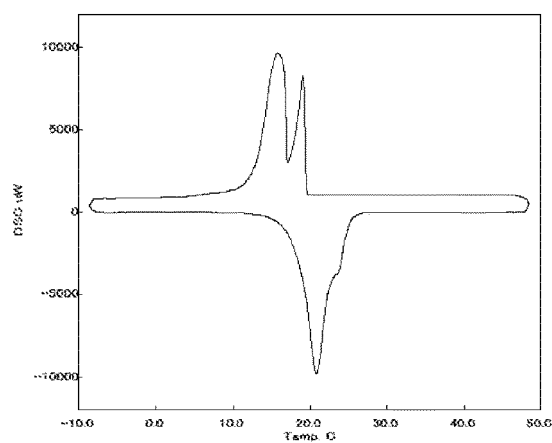
FIG. 6 is a graph of the differential scanning calorimetry result of sample 1-6 in Example 1.
Figure 7:
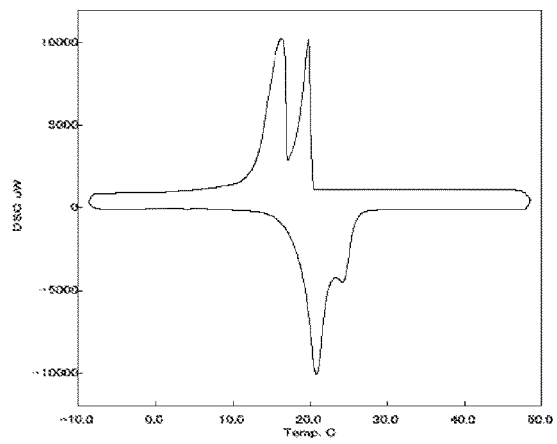
FIG. 7 is a graph of the differential scanning calorimetry result of sample 1-7 in Example 1.
Figure 8:
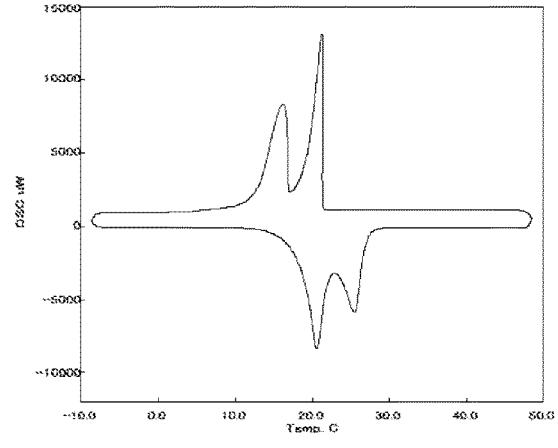
FIG. 8 is a graph of the differential scanning calorimetry result of sample 1-8 in Example 1.
Figure 9:
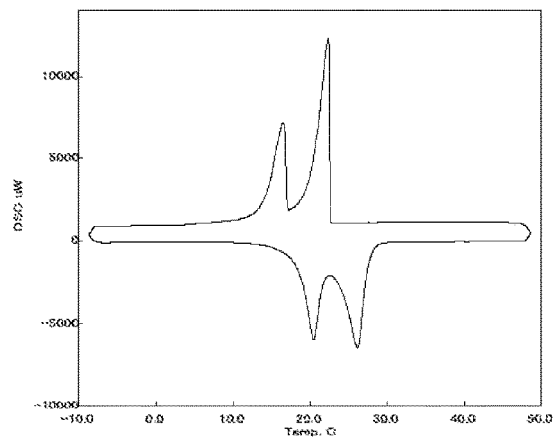
FIG. 9 is a graph of the differential scanning calorimetry result of sample 1-9 in Example 1.
Figure 10:
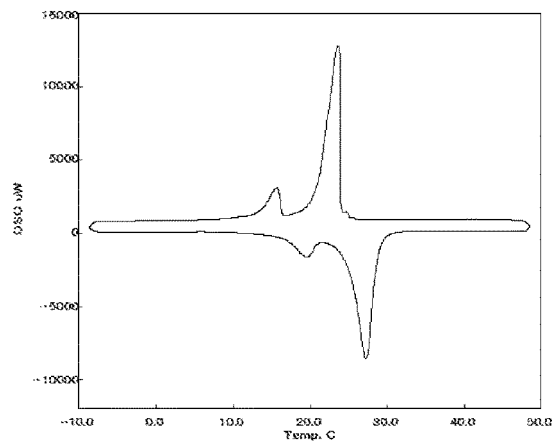
FIG. 10 is a graph of the differential scanning calorimetry result of sample 1-10 in Example 1.
Figure 11:
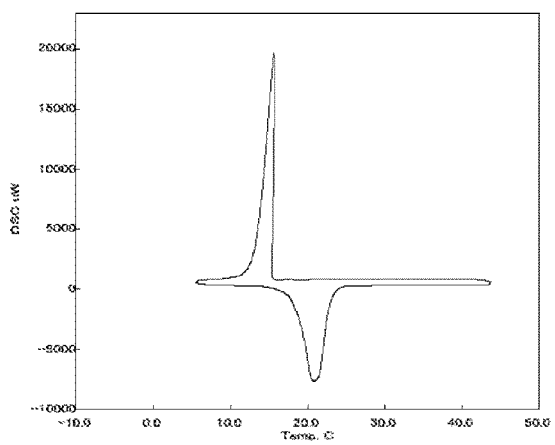
FIG. 11 is a graph of the differential scanning calorimetry result of sample 1-11 in Example 2.
Figure 12:
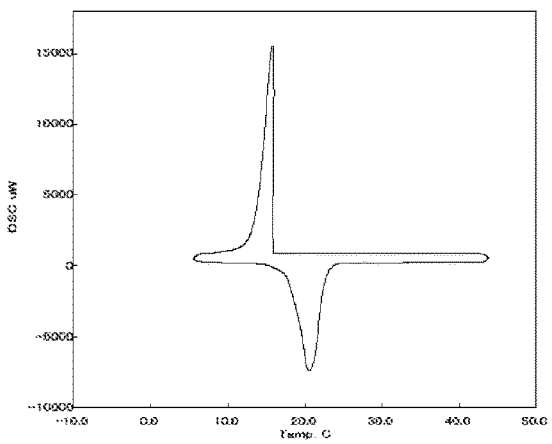
FIG. 12 is a graph of the differential scanning calorimetry result of sample 1-12 in Example 2.
Figure 13:
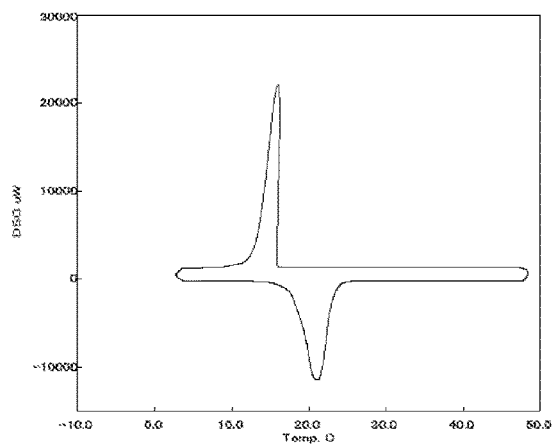
FIG. 13 is a graph of the differential scanning calorimetry result of sample 1-13 in Example 2.
Figure 14:
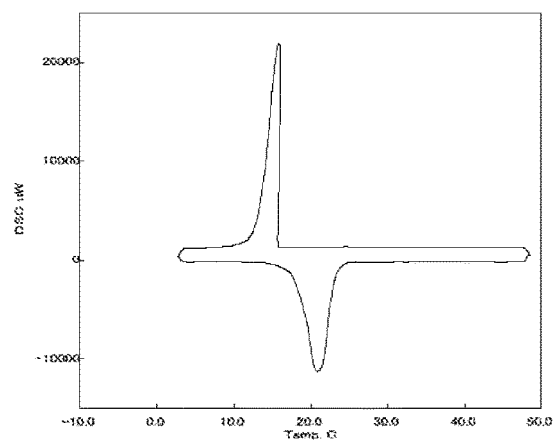
FIG. 14 is a graph of the differential scanning calorimetry result of sample 1-14 in Example 2.

Hereinafter, an embodiment according to the present invention will be described with by showing concrete examples.

A heat storage material composition of this embodiment is used in a latent heat storage material because thermal energy is absorbed when phase transition from the solidification state (solid) to the molten state (liquid) occurs, or the thermal energy is released when phase transition from the molten state (liquid) to the solidification state (solid) occurs.

The melting temperature of the heat storage material composition represents a temperature where a solid is molten to become a liquid, and the solidification temperature of the heat storage material composition represents a temperature where a liquid is solidified to become a solid. Whereas the melting temperature of heat storage material composed of the heat storage material composition represents a temperature where the phase transition of the main part from a solidification state (a solid) to a molten state (a liquid) occurs, and the solidification temperature of heat storage material composed of the heat storage material composition represents a temperature where the phase transition of the main part from a molten state (a liquid) to a solidification state (a solid) occurs. The main part represents a part that occupies with a ratio of more than 50% by weight. For example, in case that 80% by weight of the heat storage material is a solid and 20% by weight of the heat storage material is a liquid, the phase state of this heat storage material will be recognized as a solid (solidification state).

In this description, the phase state represents a common solid state, a liquid state or a gas state. According to the present invention, phase states in a solid and a liquid are mostly used.

It is desired that change of the caloric value of the heat storage material composition depending upon a rise or fall in temperature is measured using for example a differential scanning calorimeter (DSC) and that a melting temperature or a solidification temperature of the heat storage material composition is determined to a temperature of a peak of the measured caloric value. More concretely, it is desired that a temperature of the peak in the melting behavior or the solidification behavior of DSC curve measured by DSC are determined as a melting temperature or a solidification temperature, respectively, and that a temperature of a peak with the largest area is selected as a melting temperature or a solidification temperature in the presence of a plurality of peaks. In this specification, the DSC curve measured by a differential scanning type calorimeter (DSC) represents a chart or a spectrum obtained from DSC measurement at the temperature rising speed of 2° C./minute about the heat storage material composition. Desirably, the heat storage material composition provided according to the present invention has substantially a single melting peak. The single melting peak represents the peak where an area of the main melting peak is at least 90% or more, preferably 95% or more. In other words, the single melting peak represents the peak where an area of a melting peak other than the main melting peak is less than 10%, preferably less than 5%. Most preferably, the single melting peak has no melting peak other than the main melting peak, and also has no double peak, no side peak and no shoulder peak.

The heat storage material composition of this embodiment contains a higher alkane and a higher alcohol. The higher alkane and the higher alcohol are alkane with the carbon number of 6 or more (alkane of C6 or more) and alcohol with the carbon number of 6 or more (alcohol of C6 or more). Advantages of mixing the higher alkane and the higher alcohol, by selecting each of the higher alkane and the higher alcohol and by mixing them with the predetermined ratio, are as follows. First, it is possible to adjust the melting temperature and the solidification temperature with maintaining the high latent heat capacity of the higher alkane and the higher alcohol. Second, it is possible to restrain variations of the melting/solidification behavior (spectrum of DSC) of the higher alkane and the higher alcohol between their production lots, which may be caused by coexistence of several kinds of crystal structure and by difference in their existence ratio. Third, it is possible to provide a heat storage material composition with substantially single melting peak temperature and/or substantially single solidification peak temperature.

The higher alkane contained in the heat storage material composition of this embodiment may be any one of a straight-chain structure alkane and a branched-chain structure alkane. Particularly, a higher alkane having carbon number of 9 to 24 is desirable for adjusting the melting temperature or the solidification temperature. Furthermore, an alkane having carbon number of 14 or more with the melting temperatures of 0° C. or more is also desirable in view of the object of the present invention to keep warm or cold the temperature-regulation required article within a temperature range or a regulated temperature range from the nearly melting temperature of water to the nearly normal temperature, and in view of the physical properties such as the melting temperature. Concrete example of the alkane may be n-tetradecane, n-pentadecane, n-hexadecane, n-heptadecane, n-octadecane, n-nonadecane, n-eicosane, n-henicosane, n-docosane, n-tricosane or n-tetracosane. Two or more of these alkanes or one of them may be used by optionally selecting them in accordance with relationship between the regulated temperature range of the temperature-regulation required article and the melting temperature.

The higher alcohol contained in the heat storage material composition of this embodiment mainly used may be a monohydric alcohol. Particularly, this higher alcohol may be any one of a straight-chain structure alcohol, a branched-chain structure alcohol, a primary alcohol, a secondary alcohol, and a tertiary alcohol. A higher alcohol having carbon number of 6 to 20 is desirable for adjusting the melting temperature or the solidification temperature. Furthermore, a monohydric alcohol having carbon number of 10 or more with the melting temperatures of 0° C. or more is also desirable in view of the object of the present invention to keep warm or cold the temperature-regulation required article within a temperature range or a regulated temperature range from the nearly melting temperature of water to the nearly normal temperature, and in view of the physical properties such as the melting temperature. Concrete example of the alcohol may be 1-decanol, 2-decanol, undecanol, lauryl alcohol, tridecanol, myristyl alcohol, pentadecanol, cetylalcohol, heptadecanol, stearyl alcohol, nonadecanol or arachyl alcohol. Two or more of these alcohols or one of them may be used by optionally selecting them in accordance with relationship between the regulated temperature range of the temperature-regulation required article and the melting temperature.

As for the higher alcohol and the higher alkane in the heat storage material composition of this embodiment, which alcohol and alkane should be used, mutual combinations thereof and a ratio of content (composition amount) are optionally determined depending upon the management temperature of the temperature-regulation required article. For example, it is determined so that the melting temperature derived from the higher alkane and the melting temperature derived from the higher alcohol, measured by the differential scanning calorimetry, approach or conform to each other, or that its melting temperature approaches the management temperature of the temperature-regulation required article. Although it is important that the melting temperature derived from the higher alkane and the melting temperature derived from the higher alcohol, measured by the differential scanning calorimetry, approach or conform to each other and that the melting temperature approaches the management temperature of the temperature-regulation required article, combination and compounded amount of the higher alcohol and the higher alkane are preferably determined depending upon the melting temperature as index according to the present invention. This is because the solidification temperature is easily affected by the environment around the heat storage material composition (environmental temperature change, water content, container state, the presence or absence of crystalline nucleus agent including impurities such as mote and dust, the presence or absence of vibration/shock) in comparison with the melting temperature, and also it is known from experience that the melting temperature measured by the differential scanning calorimetry can be used as an index at using of the heat storage material and the transport container including the heat storage material even when phase transition from the molten state (liquid) to the solidification state (solid) occurs.

Concrete compounded amount examples of the higher alcohol and the higher alkane are shown below. However, the compounded amount of them will not be limited to these examples.

(1) n-octadecane that is a higher alkane having carbon number of 18 and lauryl alcohol that is a higher alcohol having carbon number of 12 are composed at a molar fraction of 5-35 mol % of n-octadecane and 95-65 mol % of lauryl alcohol to regulate the melting temperature within a range of 18-22° C. Particularly, by compounding to have a molar fraction of 11-35 mol % of n-octadecane and 89-65 mol % of lauryl alcohol, it is possible to approach or conform the melting peak temperature in DSC curve derived from n-octadecane and the melting peak temperature in DSC curve derived from lauryl alcohol to each other, and to set the melting peak temperature in DSC curve at 20-22° C. It is desired to compound them so as to have a molar fraction of 15-30 mol % of n-octadecane and 85-70 mol % of lauryl alcohol so that the melting peak temperature in DSC curve derived from n-octadecane and the melting peak temperature in DSC curve derived from lauryl alcohol substantially conform to each other. The heat storage material formed of a heat storage material composition with this compounded amount is ready for the management temperature of 20±5° C., especially for the management temperature of 20±2.5° C.

(2) n-hexadecane that is a higher alkane having carbon number of 16 and 1-decanol that is a higher alcohol having carbon number of 10 are composed at a molar fraction of 5-15 mol % of n-hexadecane and 95-85 mol % of 1-decanol to regulate the melting temperature within a range of 3-7° C. Particularly, by compounding to have a molar fraction of 6-15 mol % of n-hexadecane and 94-85 mol % of 1-decanol, it is possible to approach or conform the melting peak temperature in DSC curve derived from n-hexadecane and the melting peak temperature in DSC curve derived from 1-decanol to each other, and to set the melting peak temperature in DSC curve at 4-6° C. It is desired to compound them so as to have a molar fraction of 6-10 mol % of n-hexadecane and 94-90 mol % of 1-decanol so that the melting peak temperature in DSC curve derived from n-hexadecane and the melting peak temperature in DSC curve derived from 1-decanol substantially conform to each other. The heat storage material formed of a heat storage material composition with this compounded amount is ready for the management temperature of 5±3° C.

(3) n-hexadecane that is a higher alkane having carbon number of 16 and lauryl alcohol that is a higher alcohol having carbon number of 12 are composed at a molar fraction of 35-79 mol % of n-hexadecane and 65-21 mol % of lauryl alcohol to regulate the melting temperature within a range of 14-18° C. Alternatively, by composing to have a molar fraction of 35-70 mol % of n-hexadecane and 65-30 mol % of lauryl alcohol, the melting temperature is regulated within a range of 15-18° C. Particularly, by compounding to have a molar fraction of 40-79 mol % of n-hexadecane and 60-21 mol % of lauryl alcohol, it is possible to approach or conform the melting peak temperature in DSC curve derived from n-hexadecane and the melting peak temperature in DSC curve derived from lauryl alcohol to each other, and to set the melting peak temperature in DSC curve at 15-18° C. It is desired to compound them so as to have a molar fraction of 40-60 mol % of n-hexadecane and 60-40 mol % of lauryl alcohol so that the melting peak temperature in DSC curve is set at 16-17° C. and that the melting peak temperature in DSC curve derived from n-hexadecane and the melting peak temperature in DSC curve derived from lauryl alcohol substantially conform to each other. The heat storage material formed of a heat storage material composition with this compounded amount is ready for the management temperature of 15±5° C.

(4) n-pentadecane that is a higher alkane having carbon number of 15 and lauryl alcohol that is a higher alcohol having carbon number of 12 are composed at a molar fraction of 70-90 mol % of n-pentadecane and 30-10 mol % of lauryl alcohol to approach or conform the melting peak temperature in DSC curve derived from n-pentadecane and the melting peak temperature in DSC curve derived from lauryl alcohol to each other, and to regulate the melting temperature within a range of 8-12° C. It is desired to compound them so as to have a molar fraction of 82-90 mol % of n-pentadecane and 18-10 mol % of lauryl alcohol so that the melting peak temperature in DSC curve is set at 10-11° C. and that the melting peak temperature in DSC curve derived from n-pentadecane and the melting peak temperature in DSC curve derived from lauryl alcohol substantially conform to each other. The heat storage material formed of a heat storage material composition with this compounded amount is ready for the management temperature of 10±5° C.

(5) n-tetradecane that is a higher alkane having carbon number of 14 and lauryl alcohol that is a higher alcohol having carbon number of 12 are composed at a molar fraction of 70-90 mol % of n-tetradecane and 30-10 mol % of lauryl alcohol to regulate the melting temperature within a range of 6-8° C. Particularly, by compounding to have a molar fraction of 83-90 mol % of n-tetradecane and 17-10 mol % of lauryl alcohol, it is possible to approach or conform the melting peak temperature in DSC curve derived from n-tetradecane and the melting peak temperature in DSC curve derived from lauryl alcohol to each other, and to set the melting peak temperature in DSC curve at 6-7° C. It is desired to compound them so as to have a molar fraction of 82-90 mol % of n-tetradecane and 18-10 mol % of lauryl alcohol so that the melting peak temperature in DSC curve derived from n-tetradecane and the melting peak temperature in DSC curve derived from lauryl alcohol substantially conform to each other. The heat storage material formed of a heat storage material composition with this compounded amount is ready for the management temperature of 5±3° C.

(6) n-tetradecane that is a higher alkane having carbon number of 14 and 1-decanol that is a higher alcohol having carbon number of 10 are composed at a molar fraction of 15-55 mol % of n-tetradecane and 85-45 mol % of 1-decanol to regulate the melting temperature within a range of 0-4° C. Particularly, by compounding to have a molar fraction of 20-50 mol % of n-tetradecane and 80-50 mol % of 1-decanol, it is possible to approach or conform the melting peak temperature in DSC curve derived from n-tetradecane and the melting peak temperature in DSC curve derived from 1-decanol to each other, and to set the melting peak temperature in DSC curve at 0-3° C. It is desired to compound them so as to have a molar fraction of 20-40 mol % of n-tetradecane and 80-60 mol % of 1-decanol so that the melting peak temperature in DSC curve derived from n-tetradecane and the melting peak temperature in DSC curve derived from 1-decanol substantially conform to each other. The heat storage material formed of a heat storage material composition with this compounded amount is ready for the management temperature of 3±3° C.

(7) n-octadecane that is a higher alkane having carbon number of 18 and myristyl alcohol that is a higher alcohol having carbon number of 14 are composed at a molar fraction of 55-90 mol % of n-octadecane and 45-10 mol % of myristyl alcohol to regulate the melting temperature within a range of 25-29° C. Particularly, by compounding to have a molar fraction of 60-90 mol % of n-octadecane and 40-10 mol % of myristyl alcohol, it is possible to approach or conform the melting peak temperature in DSC curve derived from n-octadecane and the melting peak temperature in DSC curve derived from myristyl alcohol to each other, and to set the melting peak temperature in DSC curve at 26-28° C. It is desired to compound them so as to have a molar fraction of 65-85 mol % of n-octadecane and 35-15 mol % of myristyl alcohol so that the melting peak temperature in DSC curve derived from n-octadecane and the melting peak temperature in DSC curve derived from myristyl alcohol substantially conform to each other. The heat storage material formed of a heat storage material composition with this compounded amount is ready for the management temperature of 27±5° C.

(8) n-eicosane that is a higher alkane having carbon number of 20 and myristyl alcohol that is a higher alcohol having carbon number of 14 are composed at a molar fraction of 20-60 mol % of n-eicosane and 80-40 mol % of myristyl alcohol to regulate the melting temperature within a range of 30-34° C. Particularly, by compounding to have a molar fraction of 30-60 mol % of n-eicosane and 70-40 mol % of myristyl alcohol, it is possible to approach or conform the melting peak temperature in DSC curve derived from n-eicosane and the melting peak temperature in DSC curve derived from myristyl alcohol to each other, and to set the melting peak temperature in DSC curve at 30-33° C. It is desired to compound them so as to have a molar fraction of 30-50 mol % of n-eicosane and 70-50 mol % of myristyl alcohol so that the melting peak temperature in DSC curve derived from n-eicosane and the melting peak temperature in DSC curve derived from myristyl alcohol substantially conform to each other. The heat storage material formed of a heat storage material composition with this compounded amount is ready for the management temperature of 30±5° C.

(9) n-docosane that is a higher alkane having carbon number of 22 and myristyl alcohol that is a higher alcohol having carbon number of 14 are composed at a molar fraction of 5-47 mol % of n-docosane and 95-53 mol % of myristyl alcohol to regulate the melting temperature within a range of 34-41° C. Particularly, by compounding to have a molar fraction of 5-28 mol % of n-docosane and 95-72 mol % of myristyl alcohol, it is possible to approach or conform the melting peak temperature in DSC curve derived from n-docosane and the melting peak temperature in DSC curve derived from myristyl alcohol to each other, and to set the melting peak temperature in DSC curve at 34-37° C. It is desired to compound them so as to have a molar fraction of 9-27 mol % of n-docosane and 91-73 mol % of myristyl alcohol so that the melting peak temperature in DSC curve derived from n-docosane and the melting peak temperature in DSC curve derived from myristyl alcohol substantially conform to each other. The heat storage material formed of a heat storage material composition with this compounded amount is ready for the management temperature of 35±5° C.

(10) n-eicosane that is a higher alkane having carbon number of 20 and cetyl alcohol that is a higher alcohol having carbon number of 16 are composed at a molar fraction of 60-90 mol % of n-eicosane and 40-10 mol % of cetyl alcohol to regulate the melting temperature within a range of 34-40° C. Particularly, by compounding to have a molar fraction of 70-90 mol % of n-eicosane and 30-10 mol % of cetyl alcohol, it is possible to approach or conform the melting peak temperature in DSC curve derived from n-eicosane and the melting peak temperature in DSC curve derived from cetyl alcohol to each other, and to set the melting peak temperature in DSC curve at 34-38° C. It is desired to compound them so as to have a molar fraction of 80-90 mol % of n-eicosane and 20-10 mol % of cetyl alcohol so that the melting peak temperature in DSC curve derived from n-eicosane and the melting peak temperature in DSC curve derived from cetyl alcohol substantially conform to each other. The heat storage material formed of a heat storage material composition with this compounded amount is ready for the management temperature of 34±5° C.

(11) n-docosane that is a higher alkane having carbon number of 22 and cetyl alcohol that is a higher alcohol having carbon number of 16 are composed at a molar fraction of 40-70 mol % of n-docosane and 60-30 mol % of cetyl alcohol to regulate the melting temperature within a range of 39-44° C. Particularly, by compounding to have a molar fraction of 40-60 mol % of n-docosane and 60-40 mol % of cetyl alcohol, it is possible to approach or conform the melting peak temperature in DSC curve derived from n-docosane and the melting peak temperature in DSC curve derived from cetyl alcohol to each other, and to set the melting peak temperature in DSC curve at 41-44° C. It is desired to compound them so as to have a molar fraction of 50-70 mol % of n-docosane and 50-30 mol % of cetyl alcohol so that the melting peak temperature in DSC curve derived from n-docosane and the melting peak temperature in DSC curve derived from cetyl alcohol substantially conform to each other. The heat storage material formed of a heat storage material composition with this compounded amount is ready for the management temperature of 41±5° C.

The above-mentioned heat storage material composition is filled in a vessel or a bag mainly made by plastic to form a heat storage material. This heat storage material is in use arranged in a transport container. However, when the vessel with the heat storage material is damaged during transportation, the heat storage material composition may leak from the vessel causing that expensive temperature-regulation required articles may be polluted to make unusable and also outflow of the heat storage material composition may have a negative consequence for the environment. Thus, it is desired that the heat storage material composition is formed in a coagulation state (including a gel state) to prevent its outflow at the minimum when the vessel with the heat storage material composition is damaged during transportation. Particularly, because the heat storage material composition according to the present invention contains alkane and little content of the water, it is desired to include a hydrophobic or amphiphilic gelling agent. Examples of the gelling agent may be fumed silica; sedimentary silica; gelatinous silica; mixture of 2-ethylhexanoic acid aluminum and higher fatty acid such as lauric acid, myristic acid, palmitic acid, stearic acid, isostearic acid, behenic acid, undecylenic acid, oleic acid, linoleic acid or linolenic acid; hydroxypropyl cellulose; hydroxyethyl cellulose; hydroxyl methylcellulose; hydroxypropyl methylcellulose; carboxy methylcellulose; polyvinylpyrrolidone; and carboxy vinyl polymers. Among them, desirable is the hydroxypropyl cellulose because having superior stability of gel, amphiphilic nature, and high environment compatibility. The most of compounds generally known as gelling agents are effective for gelatification of the water, but not effective for gelatification of the heat storage material composition including no water. Whereas by using the hydroxypropyl cellulose as the gelling agent for the heat storage material composition including no water, it is possible to maintain a high melting latent heat capacity and to effectively gel without making an impact on its melting/solidification behavior. Even after the examination of heat cycle under an environmental temperature at which the heat storage material will be undergone, thus produced gel expresses no separation into solid phase and liquid phase and therefore it is possible to reduce the environment load at the leak of gel and the work load at the collection of gel.

Although the most suitable compounded amount of the gelling agent depends on the type of the gelling agent used, as for hydroxypropyl cellulose, it is desired to add 2.0-10.0% by weight of the hydroxypropyl cellulose (in case that the total amount of the heat storage material composition is 100% by weight) to the heat storage material composition, more desirably 3.0-7.0% by weight of the hydroxypropyl cellulose. A transparent gel with little fluidity may be obtained by adding hydroxypropyl cellulose of 2.0-10.0% by weight to the heat storage material composition.

Other than the above-mentioned components, crystalline nucleus agent, perfume, coloring agent, antimicrobial, high molecular polymer, other organic/inorganic compound can be combined with the heat storage material composition of this embodiment as needed.

The heat storage material is provided by filling the heat storage material composition of this embodiment in a vessel or a bag. The vessel or the bag is preferably made of a synthetic resin. The synthetic resin used for the vessel or the bag may be polyvinyl chloride, polyethylene, polypropylene, polyethylene terephthalate, polystyrene, nylon, or polyester, but should not be limited thereto. One kind of them may be independently used, or two or more kinds of them may be together used to form a multilayer structure so as to increase heat resistance or barrier properties. The shape of the vessel or the bag is desirably in a shape capable of obtaining a large surface area to increase its heat exchange rate, but is not limited thereto. By filling the heat storage material composition in such vessel or bag in a preliminarily solidified or molten state, a heat storage material is provided.

Figure 41:
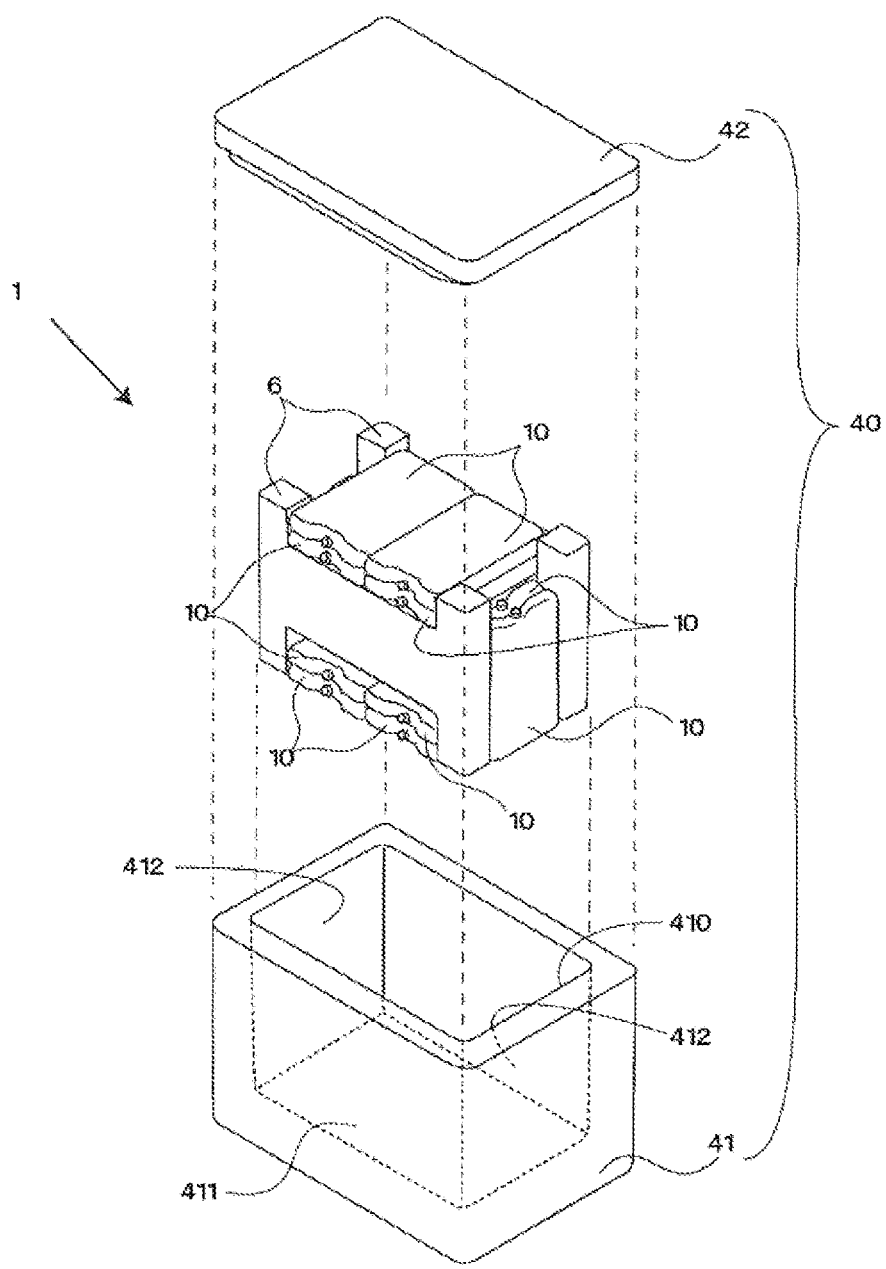
FIG. 41 is an exploded perspective view schematically illustrating a constant temperature transport container of an embodiment according to the present invention.
Figure 42:
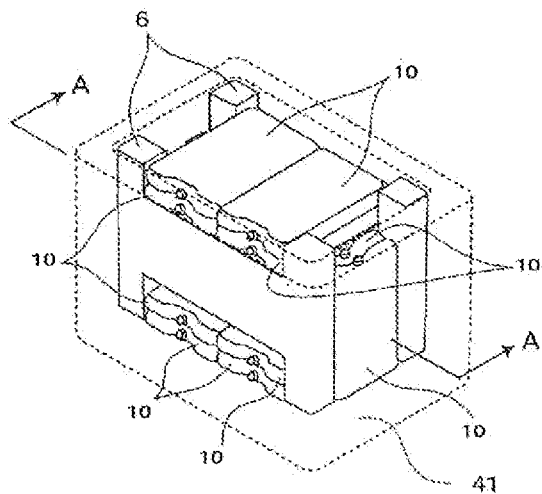
FIG. 42 (*a*) is a perspective view schematically illustrating the inside of the constant temperature transport container shown in FIG. 41, and (*b*) is a sectional view typically illustrating an A-A line section of FIG. 42 (*a*)
Figure 42:
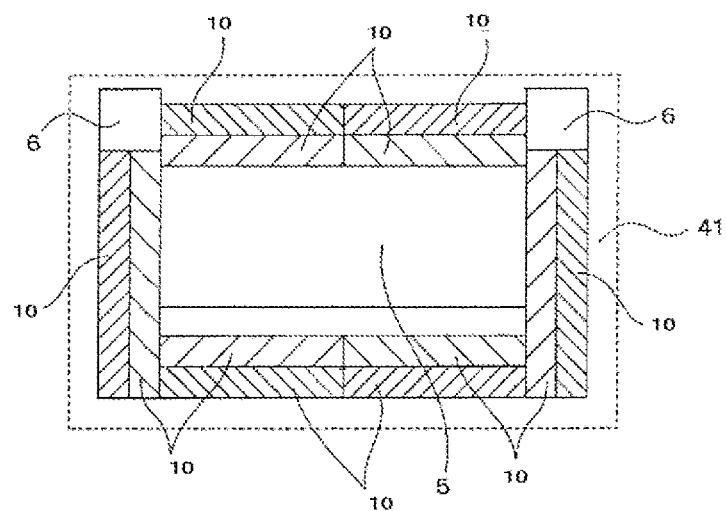

As shown in FIGS. 41 and 42, according to this embodiment, a plurality of heat storage materials 10 are housed or arranged in a transport container 40. The combination of the transport container 40 and the heat storage materials 10 are identified by reference numeral 1. The transport container 40 has for example a box 41 with an opening 410, and a cover 42 to fit into the opening 410, so as to have heat insulating properties. The transport container 40 is made of any material having heat insulating properties, and preferably made of an expanded plastic or a vacuum insulation material. The expanded plastic specifically used may be for example polyurethane foam, polystyrene foam, polyethylene foam or polypropylene foam. The vacuum insulation material specifically used may be for example one using silica powder, glass wool, or fiberglass as a core. In modifications, the transport container may be constructed from the combination of the expanded plastics and the vacuum insulation material. In this case, the outer surface or the inner surface of the box and the cover made of the expanded plastic may be covered by the vacuum insulation material, or the vacuum insulation material may be buried in the walls that constitute the box and the cover, so as to provide a transport container with a high heat insulation performance.

As shown in FIGS. 41 and 42, a spacer 6 may be arranged to fix the heat storage material 10 accommodated or arranged in the transport container 40 of this embodiment and to reserve a space 5 for storing a temperature-regulation required articles. The spacer 6 may be made of, but is not limited thereto, polyurethane, polystyrene, polyethylene, polypropylene, AS resin or ABS resin, or expanded plastics foamed them. In an embodiment according to the present invention, a pair of spacers 6 are arranged to face to each other in a transport container 40. Since the placement position of the heat storage material 10 is determined by arranging such the spacer 6, packing can be performed easily.

The transport container according to the present invention can be preferably utilized as a transportation container capable of safekeeping or transporting various articles that are necessary for temperature management with maintaining a predetermined temperature over a long period and without depending upon outer air temperature. For example, this transport container can be preferably utilized for various articles that are necessary for temperature management, such as drug medicines, medical devices, specimens, organs, chemical compounds, and foods.

Example 1

1. Production of a Heat Storage Material Composition and DSC Measurement: Lauryl Alcohol (C12) and Octadecane (C18)

Lauryl alcohol (manufactured by Kao Corporation, KAL-COL 2098) and n-octadecane (manufactured by JX Nikko Nisseki energy Co., Ltd., TS paraffin TS8) were molten in a hot water bath of 40° C., respectively. Molten octadecane and molten lauryl alcohol were combined with each other at molar fractions shown at sample numbers 1-1 to 1-10 in Table 1, respectively, and then the combination thereof was stirred in a hot water bath of 40° C. to obtain samples 1-1 to 1-10. In Table 1, "(a)" of lauryl alcohol (a) indicates that they produced in the same production lot (a). In this Example 1, the lauryl alcohol produced in the same production lot (a) was used. Similarly, the octadecane produced in the same production lot (b) was used in this Example 1.

Figure 15:
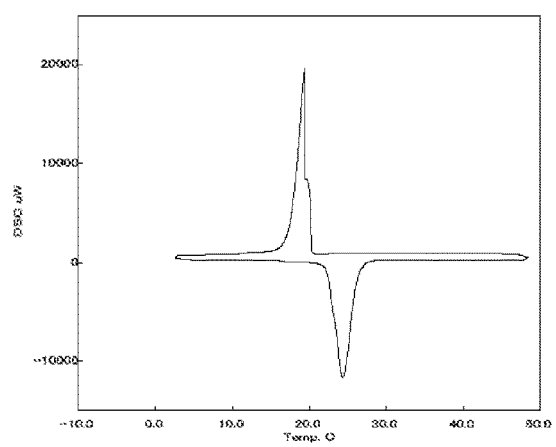
FIG. 15 is a graph of the differential scanning calorimetry result of lauryl alcohol (a)
Figure 16:
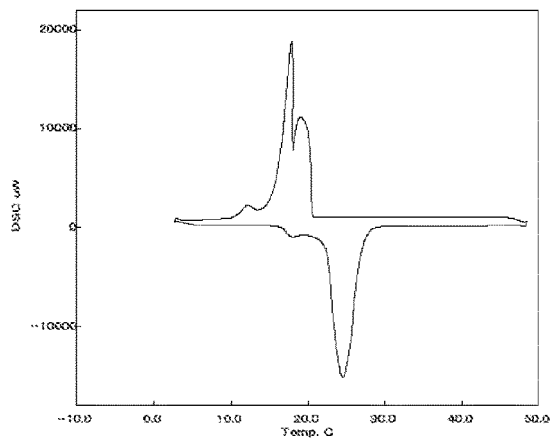
FIG. 16 is a graph of the differential scanning calorimetry result of lauryl alcohol (c)
Figure 17:
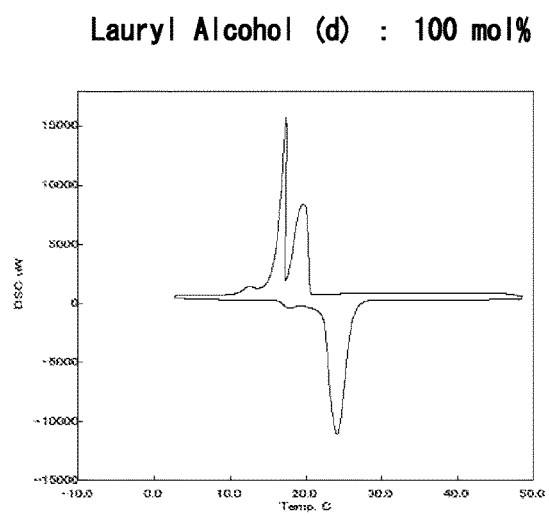
FIG. 17 is a graph of the differential scanning calorimetry result of lauryl alcohol (d)
Figure 18:
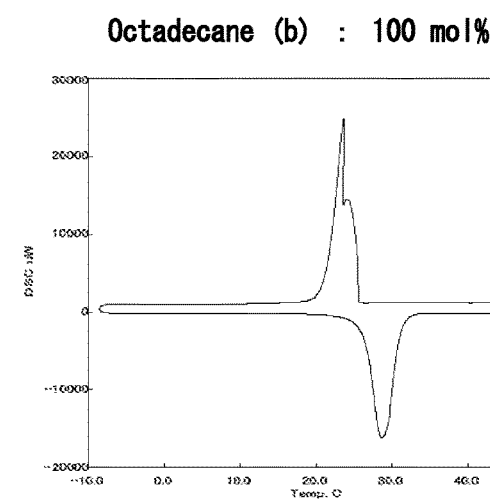
FIG. 18 is a graph of the differential scanning calorimetry result of octadecane (b)
Figure 19:
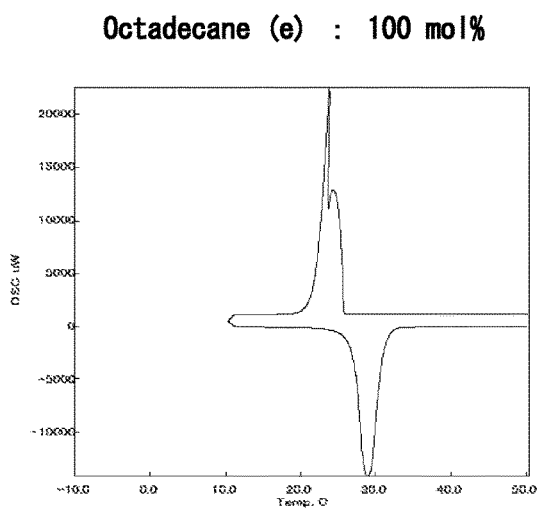
FIG. 19 is a graph of the differential scanning calorimetry result of octadecane (e)

DSC measurement using a differential scanning calorimeter (manufactured by SEIKO instrument company, SII EXSTAR6000 DSC) was performed for the obtained samples 1-1 to 1-10 at a rate of temperature rise of 2° C./min. The melting behavior of the obtained chart was analyzed, and a melting peak temperature derived from lauryl alcohol and a melting peak temperature derived from octadecane of each sample were obtained. The melting temperature of the lauryl alcohol used in this Example is 23.5-26.5° C. (FIGS. 15-17), and the melting temperature of the octadecane used is 28-30° C. (FIGS. 18 and 19). Melting latent heat capacity of each sample was similarly taken from the peak area of the obtained chart. The obtained results are shown in Table 1.

TABLE 1

| Sample Number | Higher Alcohol | Mol Fraction (mol %) | Higher Alkane | Mol Fraction (mol %) | DSC Melting Peak Temp. (° C.) Derived from Lauryl Alcohol | Derived from Octadecane | Number of Melting Peak and Behavior | Melting Latent Heat Capacity (mJ/mg) |
|---|---|---|---|---|---|---|---|---|
| 1-1 | Lauryl Alcohol (a) | 89.8 | Octadecane (b) | 10.2 | 20.4 | 22.0 | One, Shoulder at Higher Temperature Side | 219 |
| 1-2 | Lauryl Alcohol (a) | 85.1 | Octadecane (b) | 14.9 | 20.9 | 20.9 | One | 223 |

TABLE 1-continued

| | Higher Alcohol | | Higher Alkane | | DSC Melting Peak Temp. (° C.) | | | Melting |
|---|---|---|---|---|---|---|---|---|
| Sample Number | Carbon Number of 12 | Mol Fraction (mol %) | Carbon Number of 18 | Mol Fraction (mol %) | Derived from Lauryl Alcohol | Derived from Octadecane | Number of Melting Peak and Behavior | Latent Heat Capacity (mJ/mg) |
| 1-3 | Lauryl Alcohol (a) | 80.0 | Octadecane (b) | 20.0 | 20.9 | 20.9 | One | 227 |
| 1-4 | Lauryl Alcohol (a) | 74.9 | Octadecane (b) | 25.1 | 20.7 | 20.7 | One | 227 |
| 1-5 | Lauryl Alcohol (a) | 70.0 | Octadecane (b) | 30.0 | 20.8 | 20.8 | One | 236 |
| 1-6 | Lauryl Alcohol (a) | 64.9 | Octadecane (b) | 35.1 | 20.8 | 23.6 | One, Shoulder at Higher Temperature Side | 236 |
| 1-7 | Lauryl Alcohol (a) | 59.9 | Octadecane (b) | 40.1 | 20.8 | 24.4 | Two | 238 |
| 1-8 | Lauryl Alcohol (a) | 49.9 | Octadecane (b) | 50.1 | 20.7 | 25.5 | Two | 226 |
| 1-9 | Lauryl Alcohol (a) | 39.9 | Octadecane (b) | 60.1 | 20.5 | 26.2 | Two | 232 |
| 1-10 | Lauryl Alcohol (a) | 20.0 | Octadecane (b) | 80.0 | 19.6 | 27.3 | Two | 233 |

DSC spectrums of samples 1-1 to 1-10 are shown in FIGS. 1-10, respectively. The vertical axis in each figure indicates DSC heat flow (μW) and the lateral axis indicates temperature (° C.). From FIGS. 1-6 and Table 1, it is noted that, in samples 1-1 to 1-6, the combined lauryl alcohol and octadecane interact to each other to form new melting peaks at positions (at temperatures), which is different from the position of the melting peak of each ingredient, and that the formed melting peak is substantially single and the melting temperature is stable near 21° C. It is therefore revealed that, with respect to the composition consisting of lauryl alcohol and octadecane, if the lauryl alcohol is compounded to have a molar fraction of 65-89 mol % or the octadecane is compounded to have a molar fraction of 35-11 mol %, the melting temperature derived from the lauryl alcohol and the melting temperature derived from the octadecane approach or conform to each other and the melting temperature of the composition becomes to 20-22° C. Samples 1-1 and 1-6 shown in FIGS. 1 and 6 have shoulders at higher temperature sides, whereas samples 1-2 to 1-5 shown in FIGS. 2-5 have substantially no shoulder but only have single melting peaks resulting that the melting temperature becomes more stable. Therefore, with respect to the composition consisting of lauryl alcohol and octadecane, if the lauryl alcohol is compounded to have a molar fraction of 70-85 mol % or the octadecane is compounded to have a molar fraction of 30-15 mol %, the melting temperature derived from the lauryl alcohol and the melting temperature derived from the octadecane conform to each other and the melting temperature of the composition is kept substantially constant. More particularly, samples 1-3 and 1-4 shown in FIGS. 3 and 4 have molar fractions of the lauryl alcohol of 75-80 mol %, and therefore not only the melting temperatures but also the solidification temperatures have single peaks, resulting that properties for phase transition and temperature change become extremely stable. Contrary to this, each of samples 1-7 to 1-10 shown in FIGS. 7 to 10 has, with respect to each of the melting peak and the solidification peak, a plurality of peaks consisting of a peak derived from the lauryl alcohol and a peak derived from the octadecane. Also, each sample has a large width in phase transition temperature and an unstable property to the temperature change. As a result of this Example 1, it is revealed that the melting peak temperature in DSC curve derived from lauryl alcohol and the melting peak temperature in DSC curve derived from octadecane substantially approach or conform to each other by mixing lauryl alcohol and octadecane with a predetermined composition ratio, so that a heat storage material composition showing a narrow width in the phase transition temperature such as a width of 20-22° C. and a stable melting temperature can be obtained.

Example 2

2. Review of the Influence of Production Lot of Raw Material of the Composition with Respect to Melting/Solidification Behavior: Lauryl Alcohol (C12) and Octadecane (C18)

Lauryl alcohols (c) and (d) produced in production lots different from the production lot of the lauryl alcohol (a) used in Example 1 (both manufactured by Kao Corporation, KALCOL 2098), and n-octadecane (b) used in Example 1 and n-octadecane (e) produced in production lots different from the production lot of the n-octadecane (b) (both manufactured by JX Nikko Nisseki energy Co., Ltd., TS paraffin TS8) were prepared. Samples 1-11 to 1-14 were obtained in a similar way as in Example 1 except that these raw materials were mixed in predetermined compositions as shown in Table 2. DSC measurements were performed for the obtained samples as well as that in Example 1. Also, in order to examine differences of the melting/solidification behaviors between the production lots of the raw materials of the composition, the DSC measurements only for raw materials such as lauryl alcohols (a), (c) and (d) and octadecanes (b) and (e) were performed in the same condition.

TABLE 2

| | Higher Alcohol | | Higher Alkane | |
|---|---|---|---|---|
| Sample Number | Carbon Number of 12 | Mol Fraction (mol %) | Carbon Number of 18 | Mol Fraction (mol %) |
| 1-11 | Lauryl Alcohol (c) | 85.1 | Octadecane (b) | 14.9 |
| 1-12 | Lauryl Alcohol (d) | 85.1 | Octadecane (b) | 14.9 |
| 1-13 | Lauryl Alcohol (c) | 85.1 | Octadecane (e) | 14.9 |
| 1-14 | Lauryl Alcohol (d) | 85.1 | Octadecane (e) | 14.9 |

DSC spectrums of samples 1-11 to 1-14 are shown in FIGS. 11-14, respectively. Also, DSC spectrums of lauryl alcohol (a), (c) and (d) and octadecane (b) and (e), which are raw materials of the compositions, are shown in FIGS. 15-19, respectively. The vertical axis in each figure indicates DSC heat flow (μW) and the lateral axis indicates temperature (° C.). From FIGS. 15-17, it is revealed that the shapes of the DSC curves greatly differ and the melting/solidification behaviors differ among lauryl alcohol (a), (c) and (d) produced in the different production lots. Also, from FIGS.

18 and 19, it is revealed that the shapes of the DSC curves greatly differ and the melting/solidification behaviors differ between octadecane (b) and (e) produced in the different production lots. According to the DSC spectrums of these raw materials of the compositions, it is further revealed that each raw material alone has unstable behavior such as double peaks, side peaks and shoulder peaks at high rates around the melting/solidification peaks. As a result, it is understood that not only the melting/solidification behaviors of the raw materials of the compositions greatly differ between the production lots, but also the properties of the raw materials are unstable in temperature change such that they have a plurality of melting/solidification peaks.

On the other hand, by comparing with each other the DSC spectrums of samples 1-11 to 1-14 (FIGS. 11-14) and sample 1-2 (FIG. 2) composed of lauryl alcohol produced in different production lots and octadecane and mixed to have the same composition amount, it is revealed that the shapes of the DSC curves are substantially the same without depending upon the production lots of the raw materials and that the melting/solidification behaviors substantially conform to each other. Furthermore, by mixing the raw materials of the compositions with predetermined ratios, it is confirmed that the unstable behavior such as double peaks, side peaks and shoulder peaks associated with each raw material alone is dissolved and the melting/solidification peaks substantially become single peaks. As a result, it is understood that, by mixing lauryl alcohol and octadecane with a predetermined ratio, a heat storage material composition showing a constant melting/solidification behaver, a narrow width in the phase transition temperature and a stable melting temperature can be obtained even when these raw materials are produced in the different production lots.

Example 3

3. Review of the Influence of Gelatification of a Heat Storage Composition with Respect to Melting/Solidification Behavior: Lauryl Alcohol (C12) and Octadecane (C18)

Lauryl alcohol (c) of 7.74 g molten in a hot water bath of 40° C. and n-octadecane (b) of 1.86 g molten in a hot water bath of 40° C. were stirred and mixed in a hot water bath of 40° C., and thus a compound liquid of lauryl alcohol with a molar fraction of 85.0 mol % and octadecane with a molar fraction of 15.0 mol % was obtained. Hydroxypropyl cellulose (manufactured by Nippon Soda Co., Ltd., NISSOH HPC-H) of 0.4 g that is a gelling agent was added to the obtained compound liquid and the compound liquid was stirred in a hot water bath of 40° C. for about 10 minutes so as to well scatter the added gelling agent. Then, the compound liquid was left unattended at room temperature for 12 hours to obtain a transparent sample 1-15 with high viscosity. The DSC measurement of the obtained sample 1-15 was performed as well as in Examples 1 and 2.

Figure 20:
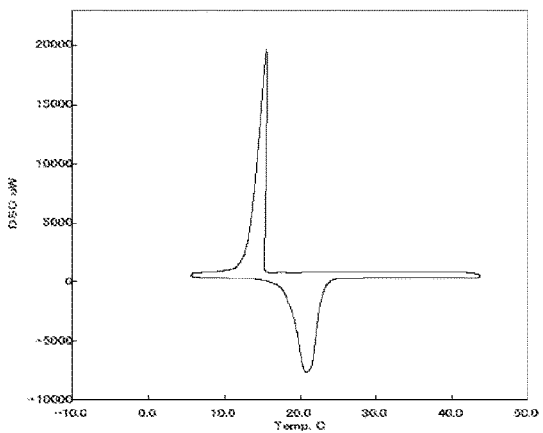
FIG. 20 is a graph of the differential scanning calorimetry result of sample 1-15 in Example 3.

DSC spectrum of sample 1-15 is shown in FIG. 20. The vertical axis in the figure indicates DSC heat flow (µW) and the lateral axis indicates temperature (° C.). By comparing the DSC spectrum of sample 1-15 shown in FIG. 20 and the DSC spectrum of sample 1-11 shown in FIG. 11, the latter has substantially the same composition amount of lauryl alcohol (c) and octadecane (b) as sample 1-15 but contains no gelling agent, it is confirmed that the shapes of the DSC curves are substantially the same without depending upon whether increasing in viscosity (gelatification) is performed by adding hydroxypropyl cellulose and that the melting/solidification behaviors substantially conform to each other. As a result, it is understood that, a heat storage material composition produced by mixing lauryl alcohol and octadecane with a predetermined ratio can show a constant melting/solidification behaver, a narrow width in the phase transition temperature and a stable melting temperature even when a gelling agent is added to make easy treatment.

Comparative Example 1

4. Production of a Heat Storage Material Composition and DSC Measurement: Lauryl Alcohol (C12) and Lauric Acid Lauryl alcohol (a) of 7.57 g molten in a hot water bath of 40° C. and lauryl acid (manufactured by Kao Corporation, LUNAC L-98) of 2.03 g molten in a hot water bath of 60° C. were stirred and mixed in a hot water bath of 40° C. and thus a compound liquid of lauryl alcohol with a molar fraction of 80.0 mol % and lauric acid with a molar fraction of 20.0 mol % was obtained. Then, as well as that in Example 3, hydroxypropyl cellulose of 0.4 g that is a gelling agent was added to the obtained compound liquid and the compound liquid was stirred in a hot water bath of 40° C. for about 10 minutes so as to well scatter the added gelling agent. Thereafter, the compound liquid was left unattended at room temperature for 12 hours to obtain a transparent sample 1-16 with high viscosity. Also, a sample 1-17 was obtained through the similar processes except that lauryl alcohol (c) was used instead of the lauryl alcohol (a). The DSC measurements of the obtained samples 1-16 and 1-17 were performed as well as in Examples 1 and 2. Also, the DSC measurement of the used lauric acid alone was performed under the same condition to obtain DSC spectrum of raw material of the composition.

Figure 21:
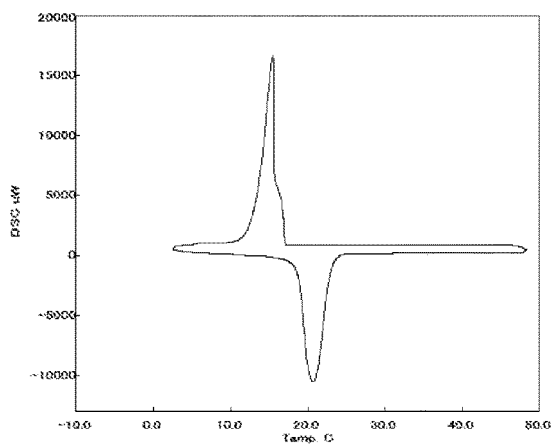
FIG. 21 is a graph of the differential scanning calorimetry result of sample 1-16 in Comparative Example 1.
Figure 22:
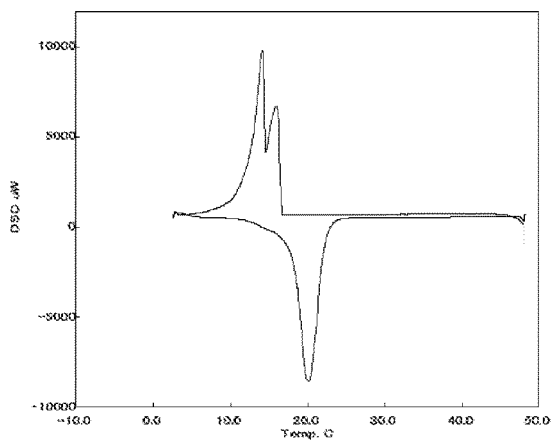
FIG. 22 is a graph of the differential scanning calorimetry result of sample 1-17 in Comparative Example 1.
Figure 23:
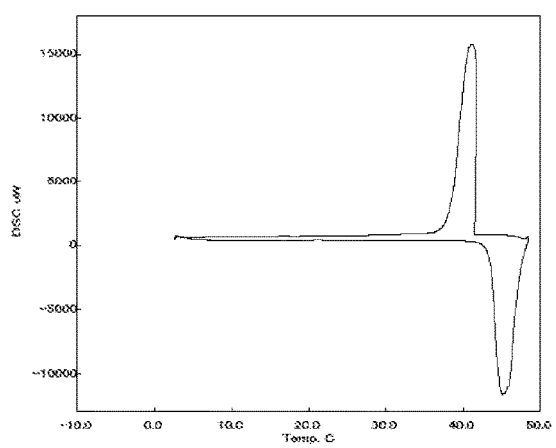
FIG. 23 is a graph of the differential scanning calorimetry result of lauric acid.

DSC spectrums of samples 1-16 and 1-17 are shown in FIGS. 21 and 22, respectively. Also, DSC spectrum of the lauric acid that is the raw material of the composition is shown in FIG. 23. The vertical axis in each figure indicates DSC heat flow (µW) and the lateral axis indicates temperature (° C.). From the DSC spectrums of FIGS. 21-23, it is revealed that although the melting temperature of the obtained compound liquid can be adjusted around 20° C., influence of lauryl alcohols (a) and (c) produced in the different production lots is conspicuously seen. That is the shapes of the DSC curves of samples 1-16 and 1-17 greatly differ with each other, and the melting/solidification behavers differ in every sample. It is also confirmed that although the unstable behavior such as double peaks, side peaks and shoulder peaks associated with each raw material alone was dissolved by combining lauryl alcohol and octadecane, this unstable behavior is not dissolved by combining lauryl alcohol and lauric acid.

Example 4

5. Production of a Heat Storage Material Composition and DSC Measurement: 1-Decanol (C10) and Hexadecane (C16)

1-decanol (manufactured by Kao Corporation, KALCOL 1098) and n-hexadecane (manufactured by JX Nikko Nisseki energy Co., Ltd., TS paraffin TS6) were molten in an atmosphere of 23° C., respectively. Molten hexadecane and molten 1-decanol were combined with each other at molar fractions shown at sample numbers 2-1 to 2-9 in Table 3, respectively, and then the combinations thereof were stirred in the atmosphere of 23° C. to obtain samples 2-1 to 2-9. In Table 3, "(f)" of 1-decanol (f) indicates that they produced in the same production lot (f). In this Example 4, the 1-decanol produced in the same production lot (f) was used. Similarly, the hexadecane produced in the same production lot (g) was used in this Example 4.

Figure 36:
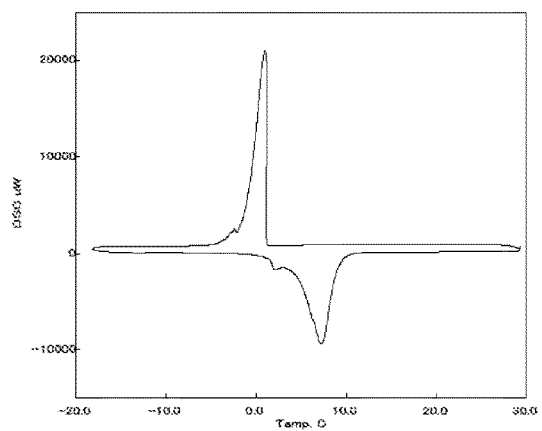
FIG. 36 is a graph of the differential scanning calorimetry result of 1-decanol (f)
Figure 37:
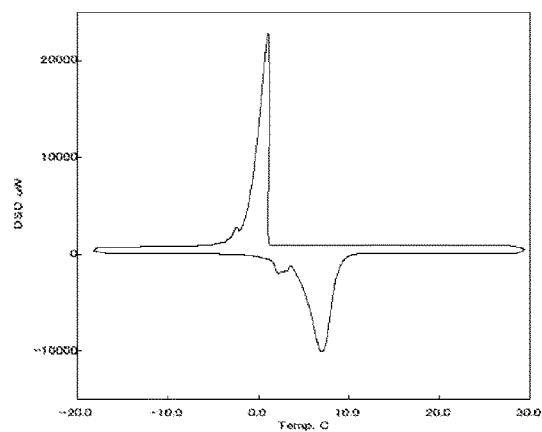
FIG. 37 is a graph of the differential scanning calorimetry result of 1-decanol (h)
Figure 38:
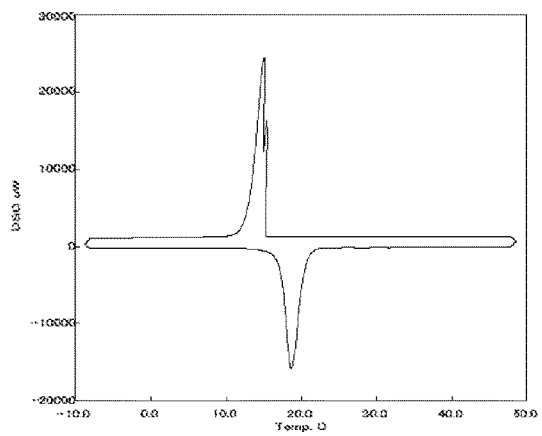
FIG. 38 is a graph of the differential scanning calorimetry result of hexadecane (g)
Figure 39:
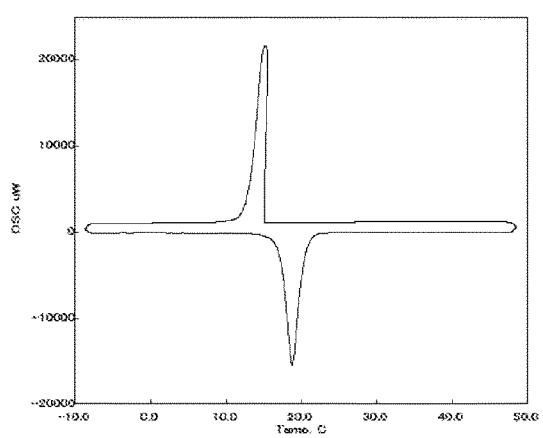
FIG. 39 is a graph of the differential scanning calorimetry result of hexadecane (i)

DSC measurements using were performed for the obtained samples 2-1 to 2-9 as well as that in Example 1. The melting behaviors of the obtained chart were analyzed, and a melting peak temperature derived from 1-decanol and a melting peak temperature derived from hexadecane of each sample were obtained. The melting temperature of the 1-decanol used in this Example is about 5-7° C. (FIGS. 36 and 37), and the melting temperature of the hexadecane used is about 18° C. (FIGS. 38 and 39). Melting latent heat capacity of each sample was similarly taken from the peak area of the obtained chart. The obtained results are shown in Table 3.

Figure 24:
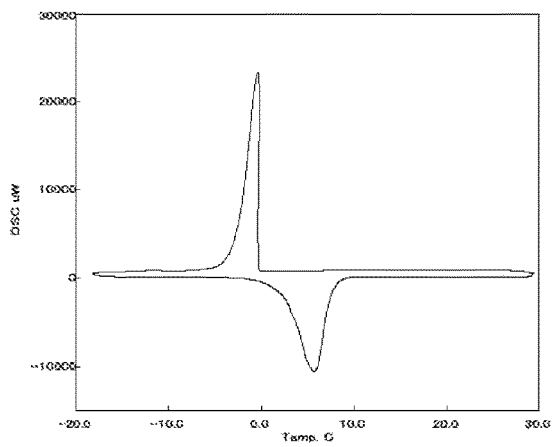
FIG. 24 is a graph of the differential scanning calorimetry result of sample 2-1 in Example 4.
Figure 25:
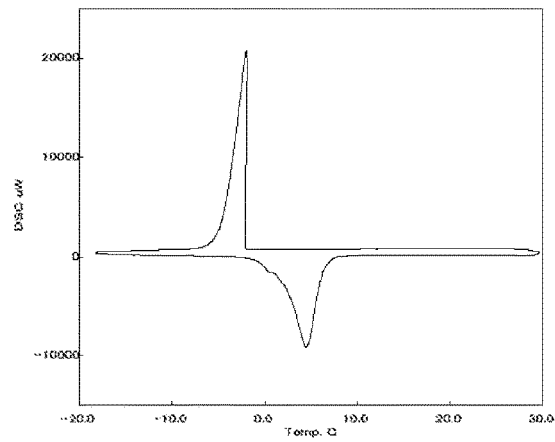
FIG. 25 is a graph of the differential scanning calorimetry result of sample 2-2 in Example 4.
Figure 26:
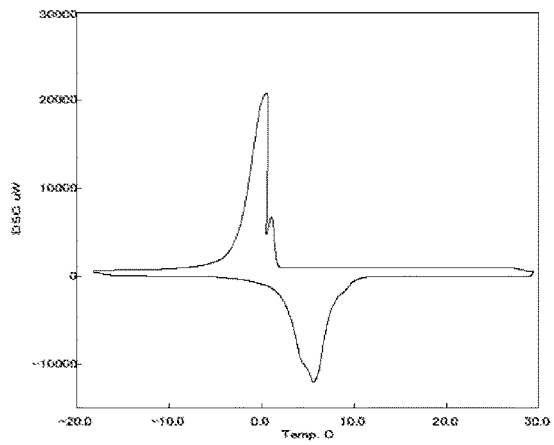
FIG. 26 is a graph of the differential scanning calorimetry result of sample 2-3 in Example 4.
Figure 27:
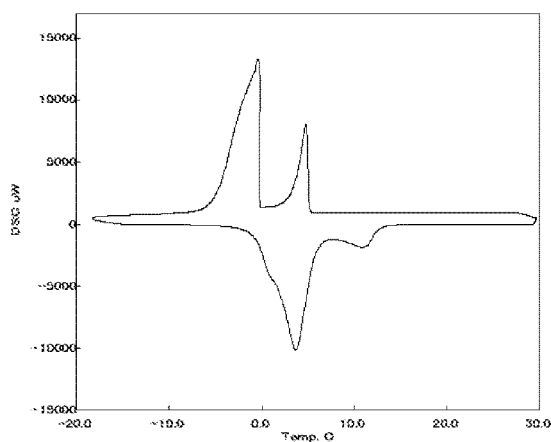
FIG. 27 is a graph of the differential scanning calorimetry result of sample 2-4 in Example 4.
Figure 28:
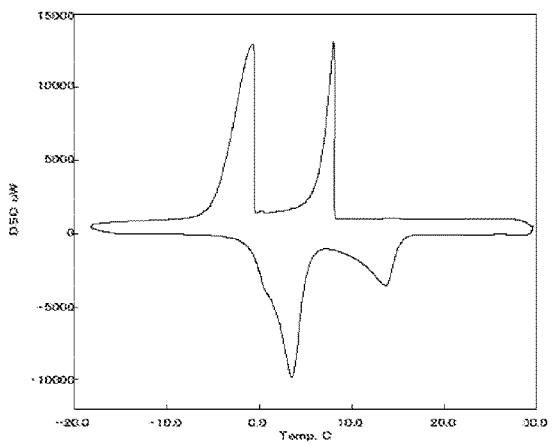
FIG. 28 is a graph of the differential scanning calorimetry result of sample 2-5 in Example 4.
Figure 29:
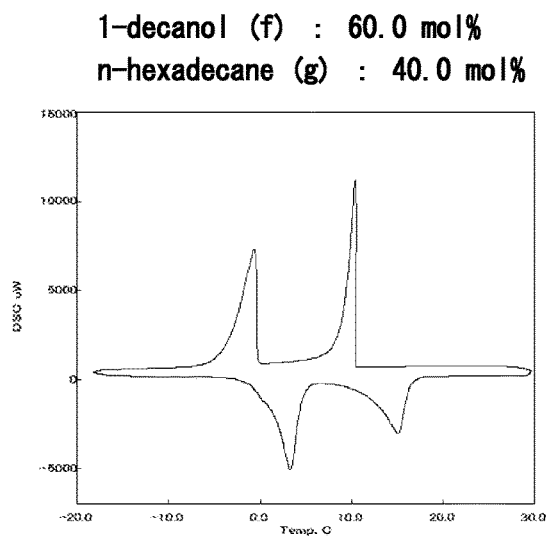
FIG. 29 is a graph of the differential scanning calorimetry result of sample 2-6 in Example 4.
Figure 30:
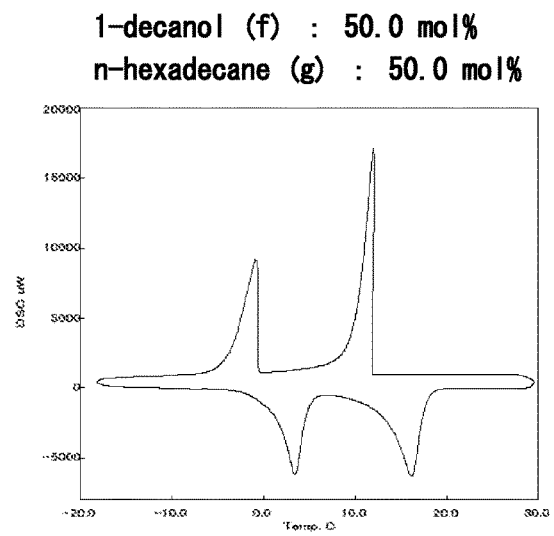
FIG. 30 is a graph of the differential scanning calorimetry result of sample 2-7 in Example 4.
Figure 31:
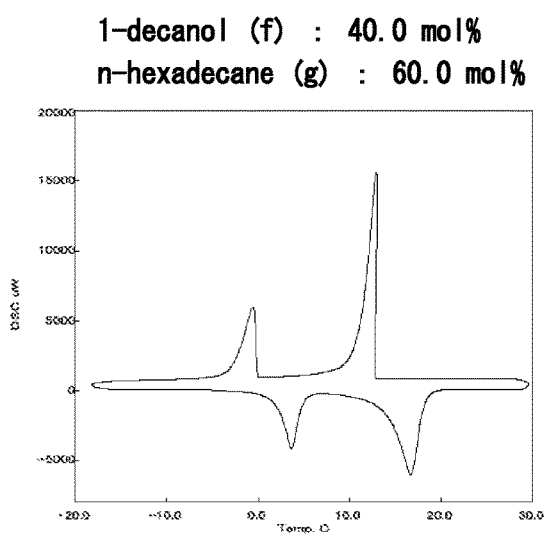
FIG. 31 is a graph of the differential scanning calorimetry result of sample 2-8 in Example 4.
Figure 32:
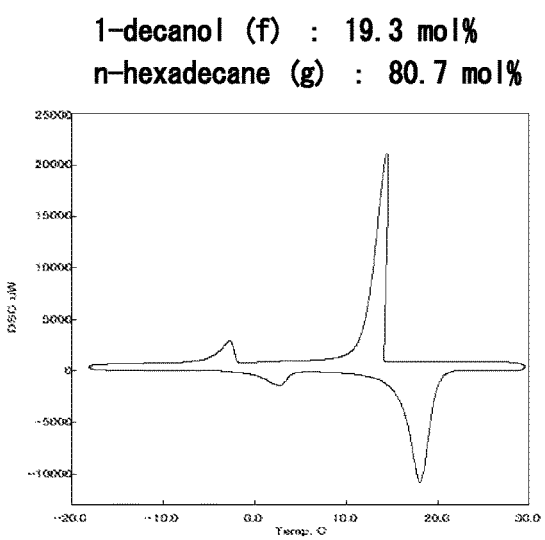
FIG. 32 is a graph of the differential scanning calorimetry result of sample 2-9 in Example 4.

2-1 and 2-2 shown in FIGS. 24 and 25 has a single peak in not only the melting temperature but also the solidification temperature, resulting that properties for phase transition and temperature change become extremely stable. Contrary to this, each of samples 2-4 to 2-9 shown in FIGS. 27 to 32 has, with respect to each of the melting peak and the solidification peak, a plurality of peaks consisting of a peak derived from the 1-decanol and a peak derived from the hexadecane. Also, each sample has a large width in phase transition temperature and an unstable property to the temperature change. As a result of this Example 4, it is revealed that the melting peak temperature in DSC curve derived from 1-decanol and the melting peak temperature in DSC curve derived from hexadecane substantially approach or conform to each other by mixing 1-decanol and hexadecane with a predetermined composition ratio, so that a heat storage material composition showing a narrow width in the

TABLE 3

| | Higher Alcohol | | Higher Alkane | | DSC Melting Peak Temp. (° C.) | | | Melting Latent Heat Capacity (mJ/mg) |
|---|---|---|---|---|---|---|---|---|
| Sample Number | Carbon Number of 10 | Mol Fraction (mol %) | Carbon Number of 16 | Mol Fraction (mol %) | Derived from 1-decanol | Derived from Hexadecane | Number of Melting Peak and Behavior | |
| 2-1 | 1-decanol (f) | 94.1 | Hexadecane (g) | 5.9 | 5.7 | 5.7 | One | 215 |
| 2-2 | 1-decanol (f) | 90.1 | Hexadecane (g) | 9.9 | 5.4 | 5.4 | One | 210 |
| 2-3 | 1-decanol (f) | 85.0 | Hexadecane (g) | 15.0 | 4.5 | 5.7 | One, Shoulder at Lower Temperature Side | 210 |
| 2-4 | 1-decanol (f) | 80.0 | Hexadecane (g) | 20.0 | 3.7 | 11.2 | Two | 225 |
| 2-5 | 1-decanol (f) | 70.0 | Hexadecane (g) | 30.0 | 3.5 | 13.7 | Two | 225 |
| 2-6 | 1-decanol (f) | 60.0 | Hexadecane (g) | 40.0 | 3.2 | 15.1 | Two | 219 |
| 2-7 | 1-decanol (f) | 50.0 | Hexadecane (g) | 50.0 | 3.4 | 16.1 | Two | 237 |
| 2-8 | 1-decanol (f) | 40.0 | Hexadecane (g) | 60.0 | 3.8 | 16.6 | Two | 213 |
| 2-9 | 1-decanol (f) | 19.3 | Hexadecane (g) | 80.7 | 2.8 | 17.9 | Two | 227 |

DSC spectrums of samples 2-1 to 2-9 are shown in FIGS. 24-32, respectively. The vertical axis in each figure indicates DSC heat flow (µW) and the lateral axis indicates temperature (° C.). From FIGS. 24-26 and Table 3, it is noted that, in samples 2-1 to 2-3, the combined 1-decanol and hexadecane interact to each other to form a new melting peak at a position (at a temperature), which is different from the position of the melting peak of each ingredient, and that the formed melting peak is substantially single and the melting temperature is stable near 5° C. It is therefore revealed that, with respect to the composition consisting of 1-decanol and hexadecane, if the 1-decanol is compounded to have a molar fraction of 85-94 mol % or the hexadecane is compounded to have a molar fraction of 15-6 mol %, the melting temperature derived from the 1-decanol and the melting temperature derived from the hexadecane approach or conform to each other and the melting temperature of the composition can be set within a narrow width of 4-6° C. Sample 2-3 shown in FIG. 26 has a shoulder at lower temperature side, whereas samples 2-1 and 2-2 shown in FIGS. 24 and 25 have only single melting peaks and the melting temperatures become more stable. Therefore, with respect to the composition consisting of 1-decanol and hexadecane, if the 1-decanol is compounded to have a molar fraction of 90-94 mol % or the hexadecane is compounded to have a molar fraction of 10-6 mol %, the melting temperature derived from the 1-decanol and the melting temperature derived from the hexadecane conform to each other and the melting temperature of the composition is kept substantially constant. More particularly, each of samples phase transition temperature such as a width of 4-6° C. and a stable melting temperature can be obtained.

Example 5

6. Review of the Influence of Production Lot of Raw Material of the Composition with Respect to Melting/Solidification Behavior: 1-Decanol (C10) and Hexadecane (C16)

1-decanol (f) used in Example 4 and 1-decanol (h) produced in a production lot different from the production lot of the 1-decanol (f) (both manufactured by Kao Corporation, KALCOL 1098), and n-hexadecane (g) used in Example 4 and n-hexadecane (i) produced in a production lot different from the production lot of the n-hexadecane (g) (both manufactured by JX Nikko Nisseki energy Co., Ltd., TS paraffin TS6) were prepared. Samples 2-10 to 2-12 were obtained in a similar way as in Example 4 except that the raw materials were mixed in predetermined compositions as shown in Table 4. DSC measurements were performed for the obtained samples as well as that in Example 4. Also, in order to examine differences of the melting/solidification behaviors between the production lots of the raw materials of the compositions, the DSC measurements only for raw materials such as 1-decanol (f) and (h) and hexadecane (g) and (i) were performed in the same condition.

TABLE 4

| Sample Number | Higher Alcohol | | Higher Alkane | |
| --- | --- | --- | --- | --- |
| | Carbon Number of 10 | Mol Fraction (mol %) | Carbon Number of 16 | Mol Fraction (mol %) |
| 2-10 | 1-decanol (h) | 90.1 | Hexadecane (g) | 9.9 |
| 2-11 | 1-decanol (f) | 90.1 | Hexadecane (i) | 9.9 |
| 2-12 | 1-decanol (h) | 90.1 | Hexadecane (i) | 9.9 |

Figure 33:
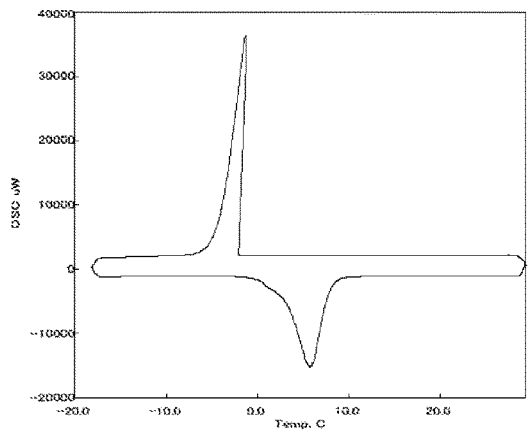
FIG. 33 is a graph of the differential scanning calorimetry result of sample 2-10 in Example 5.
Figure 34:
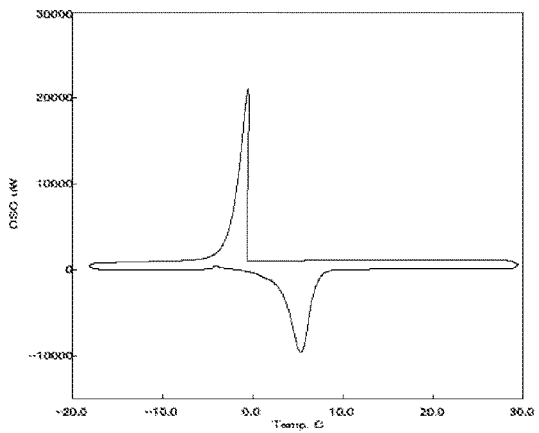
FIG. 34 is a graph of the differential scanning calorimetry result of sample 2-11 in Example 5.
Figure 35:
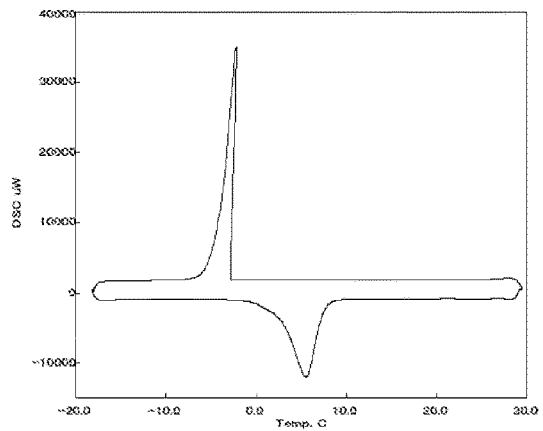
FIG. 35 is a graph of the differential scanning calorimetry result of sample 2-12 in Example 5.

DSC spectrums of samples 2-10 to 2-12 are shown in FIGS. 33-35, respectively. Also, DSC spectrums of 1-decanol (f) and (h) and hexadecane (g) and (i), which are raw materials of the compositions, are shown in FIGS. 36-39, respectively. The vertical axis in each figure indicates DSC heat flow (μW) and the lateral axis indicates temperature (° C.). From FIGS. 36-39, it is revealed that the shapes of the DSC curves greatly differ and the melting/solidification behaviors differ between 1-decanol produced in the different production lots and also between hexadecane produced in the different production lots. Also, according to the DSC spectrums of these raw materials of the compositions, it is further revealed that each raw material alone has unstable behavior such as double peaks, side peaks and shoulder peaks at a high rate around the melting/solidification peak. As a result, it is understood that not only the melting/solidification behaviors of the raw materials of the compositions greatly differ between the production lots, but also the properties of the raw materials are unstable in temperature change such that they have a plurality of melting/solidification peaks.

On the other hand, by comparing with each other the DSC spectrums of samples 2-10 to 2-12 (FIGS. 33-35) and sample 2-2 (FIG. 25) composed of 1-decanol produced in different production lots and hexadecane and mixed to have the same composition amount, it is revealed that the shapes of the DSC curves are substantially the same without depending upon the production lots of the raw materials and that the melting/solidification behaviors substantially conform to each other. Furthermore, by mixing the raw materials of the compositions with predetermined ratios, it is confirmed that the unstable behavior such as double peaks, side peaks and shoulder peaks associated with each raw material alone is dissolved and the melting/solidification peaks substantially become single peaks. As a result, it is understood that, by mixing 1-decanol and hexadecane with a predetermined ratio, a heat storage material composition showing a constant melting/solidification behaver, a narrow width in the phase transition temperature and a stable melting temperature can be obtained even when these raw materials are produced in the different production lots.

Example 6

7. Review of the Influence of Gelatification of a Heat Storage Composition with Respect to Melting/Solidification Behavior: 1-Decanol (C10) and Hexadecane (C16)

1-decanol (f) of 8.64 g and hexadecane (g) of 1.36 g were stirred and mixed in an atmosphere of 23° C., and thus a compound liquid of 1-decanol with a molar fraction of 90.0 mol % and hexadecane with a molar fraction of 10.0 mol % was obtained. Hydroxypropyl cellulose (manufactured by Nippon Soda Co., Ltd., NISSOH HPC-H) of 0.4 g that is a gelling agent was added to the obtained compound liquid and the compound liquid was stirred in an atmosphere of 23° C. for about 10 minutes so as to well scatter the added gelling agent. Then, the compound liquid was left unattended at room temperature for 12 hours to obtain a transparent sample 2-13 with high viscosity. The DSC measurement of the obtained sample 2-13 was performed as well as in the above-mentioned Example.

Figure 40:
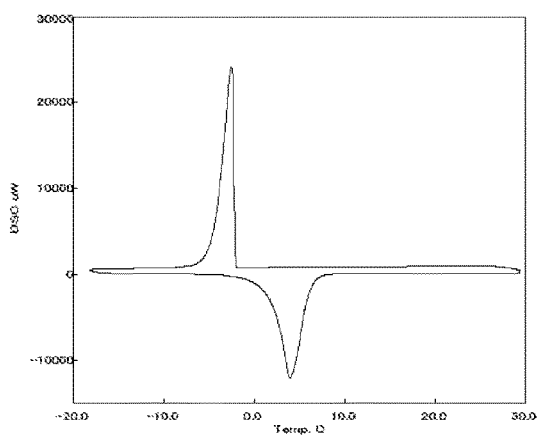
FIG. 40 is a graph of the differential scanning calorimetry result of sample 2-13 in Example 6.

DSC spectrum of sample 2-13 is shown in FIG. 40. The vertical axis in the figure indicates DSC heat flow (μW) and the lateral axis indicates temperature (° C.). By comparing the DSC spectrum of sample 2-13 shown in FIG. 40 and the DSC spectrum of sample 2-2 shown in FIG. 25, the latter has substantially the same composition amount of 1-decanol (f) and hexadecane (g) as sample 2-13 but contains no gelling agent, it is confirmed that the shapes of the DSC curves are substantially the same without depending upon whether increasing in viscosity (gelatification) is performed by adding hydroxypropyl cellulose and that the melting/solidification behaviors substantially conform to each other. As a result, it is understood that, a heat storage material composition produced by mixing 1-decanol and hexadecane with a predetermined ratio can show a constant melting/solidification behaver, a narrow width in the phase transition temperature and a stable melting temperature even when a gelling agent is added to make easy treatment.

Example 7

8. Production of a Heat Storage Material Composition and DSC Measurement: Lauryl Alcohol (C12) and Hexadecane (C16)

Lauryl alcohol (manufactured by Kao Corporation, KAL-COL 2098) and hexadecane (manufactured by JX Nikko Nisseki energy Co., Ltd., TS paraffin TS6) were molten in a hot water bath of 40° C., respectively. Molten lauryl alcohol and molten hexadecane were combined with each other at molar fractions shown at sample numbers 3-1 to 3-7 in Table 5, respectively, and then the combination thereof was stirred in a hot water bath of 40° C. to obtain samples 3-1 to 3-7. In this Example 7, the lauryl alcohol produced in the same production lot was used. Similarly, the hexadecane produced in the same production lot was used in this Example 7. DSC measurements using the same instrument under the same measurement conditions as in the above-mentioned Example were performed for the obtained samples. The melting behaviors of the obtained chart were analyzed, and a melting peak temperature derived from lauryl alcohol and a melting peak temperature derived from hexadecane of each sample were obtained. Also, melting latent heat capacity of each sample was similarly obtained. The obtained results are shown in Table 5.

TABLE 5

| Sample Number | Higher Alcohol Carbon Number of 12 | Mol Fraction (mol %) | Higher Alkane Carbon Number of 16 | Mol Fraction (mol %) | DSC Melting Peak Temp. (° C.) Derived from Lauryl Alcohol | Derived from Hexadecane | Number of Melting Peak and Behavior | Melting Latent Heat Capacity (mJ/mg) |
|---|---|---|---|---|---|---|---|---|
| 3-1 | Lauryl Alcohol | 20.3 | Hexadecane | 79.7 | 17.5 | 16.3 | One, Shoulder at Lower Temperature Side | 244 |
| 3-2 | Lauryl Alcohol | 40.0 | Hexadecane | 60.0 | 16.0 | 16.0 | One | 240 |
| 3-3 | Lauryl Alcohol | 51.7 | Hexadecane | 48.3 | 16.6 | 16.6 | One | 240 |
| 3-4 | Lauryl Alcohol | 60.1 | Hexadecane | 39.9 | 16.3 | 16.3 | One | 233 |
| 3-5 | Lauryl Alcohol | 70.1 | Hexadecane | 29.9 | 18.6 | 15.8 | Two | 212 |
| 3-6 | Lauryl Alcohol | 80.0 | Hexadecane | 20.0 | 20.3 | 15.6 | Two | 220 |
| 3-7 | Lauryl Alcohol | 10.0 | Hexadecane | 90.0 | 21.9 | 15.0 | Two | 224 |

From Table 5, it is noted that, in samples 3-1 to 3-4, the combined lauryl alcohol and hexadecane interact to each other to form new melting peaks at positions (at temperatures), which are different from the position of the melting peak of each ingredient, and that the formed melting peaks are substantially single and the melting temperatures are stable near 16° C. It is therefore revealed that, with respect to the compositions consisting of lauryl alcohol and hexadecane, if the lauryl alcohol is compounded to have a molar fraction of 21-60 mol % or the hexadecane is compounded to have a molar fraction of 79-40 mol %, the melting temperature derived from the lauryl alcohol and the melting temperature derived from the hexadecane approach or conform to each other and the melting temperatures of the compositions become to 15-18° C. Sample 3-1 has a shoulder at higher temperature side, whereas samples 3-2 to 3-4 have single melting peaks alone resulting that the melting temperatures become more stable. Therefore, with respect to the composition consisting of lauryl alcohol and hexadecane, if the lauryl alcohol is compounded to have a molar fraction of 40-60 mol % or the hexadecane is compounded to have a molar fraction of 60-40 mol %, the melting temperature derived from the lauryl alcohol and the melting temperature derived from the hexadecane conform to each other and the melting temperature of the composition is kept substantially constant (16-17° C.). As a result, it is revealed that the melting peak temperature in DSC curve derived from lauryl alcohol and the melting peak temperature in DSC curve derived from hexadecane substantially approach or conform to each other by mixing lauryl alcohol and hexadecane with a predetermined composition ratio, so that a heat storage material composition showing a narrow width in the phase transition temperature such as near 16° C. and a stable melting temperature can be obtained.

Example 8

9. Production of a Heat Storage Material Composition and DSC Measurement: Lauryl Alcohol (C12) and Pentadecane (C15)

Lauryl alcohol (manufactured by Kao Corporation, KAL-COL 2098) molten in a hot water bath of 40° C. and pentadecane (manufactured by JX Nikko Nisseki energy Co., Ltd., TS paraffin TS5) molten in an atmosphere of 23° C. were prepared. Molten lauryl alcohol and molten pentadecane were combined with each other at molar fractions shown at sample numbers 4-1 to 4-9 in Table 6, respectively, and then the combination thereof was stirred in a hot water bath of 40° C. to obtain samples 4-1 to 4-9. In this Example 8, the lauryl alcohol produced in the same production lot was used. Similarly, the pentadecane produced in the same production lot was used in this Example 8. DSC measurements using the same instrument under the same measurement conditions as in the above-mentioned Example were performed for the obtained samples. The melting behaviors of the obtained charts were analyzed, and a melting peak temperature derived from lauryl alcohol and a melting peak temperature derived from pentadecane of each sample were obtained. Also, melting latent heat capacity of each sample was similarly obtained. The obtained results are shown in Table 6.

TABLE 6

| Sample Number | Higher Alcohol Carbon Number of 12 | Mol Fraction (mol %) | Higher Alkane Carbon Number of 15 | Mol Fraction (mol %) | DSC Melting Peak Temp. (° C.) Derived from Lauryl Alcohol | Derived from Pentadecane | Number of Melting Peak and Behavior | Melting Latent Heat Capacity (mJ/mg) |
|---|---|---|---|---|---|---|---|---|
| 4-1 | Lauryl Alcohol | 10.0 | Pentadecane | 90.0 | 10.5 | 10.5 | One | 177 |
| 4-2 | Lauryl Alcohol | 17.7 | Pentadecane | 82.3 | 10.0 | 10.0 | One | 184 |
| 4-3 | Lauryl Alcohol | 30.0 | Pentadecane | 70.0 | 10.0 | 10.0 | One, Shoulder at Higher Temperature Side | 196 |
| 4-4 | Lauryl Alcohol | 36.1 | Pentadecane | 63.9 | 14.0 | 9.9 | Two | 196 |
| 4-5 | Lauryl Alcohol | 45.9 | Pentadecane | 54.1 | 15.5 | 9.7 | Two | 197 |
| 4-6 | Lauryl Alcohol | 56.0 | Pentadecane | 44.0 | 16.7 | 9.7 | Two | 202 |
| 4-7 | Lauryl Alcohol | 66.4 | Pentadecane | 33.6 | 17.9 | 9.4 | Two | 204 |
| 4-8 | Lauryl Alcohol | 77.0 | Pentadecane | 23.0 | 19.8 | 9.5 | Two | 217 |
| 4-9 | Lauryl Alcohol | 88.2 | Pentadecane | 11.8 | 21.3 | 9.2 | Two | 220 |

From Table 6, it is noted that, in samples 4-1 to 4-3, the combined lauryl alcohol and pentadecane interact to each other to form new melting peaks at positions (at temperatures), which are different from the position of the melting peak of each ingredient, and that the formed melting peaks are substantially single and the melting temperatures are stable near 10° C. It is therefore revealed that, with respect to the composition consisting of lauryl alcohol and pentadecane, if the lauryl alcohol is compounded to have a molar fraction of 10-30 mol % or the pentadecane is compounded to have a molar fraction of 90-70 mol %, the melting temperature derived from the lauryl alcohol and the melting temperature derived from the pentadecane approach or conform to each other and the melting temperature of the composition becomes to 9-11° C. Sample 4-3 has a shoulder at higher temperature side, whereas samples 4-1 and 4-2 have single melting peaks alone resulting that the melting temperatures become more stable. Therefore, with respect to the composition consisting of lauryl alcohol and pentadecane, if the lauryl alcohol is compounded to have a molar fraction of 10-18 mol % or the pentadecane is compounded to have a molar fraction of 90-82 mol %, the melting temperature derived from the lauryl alcohol and the melting temperature derived from the pentadecane conform to each other and the melting temperature of the composition is kept substantially constant (10-11° C.). As a result, it is revealed that the melting peak temperature in DSC curve derived from lauryl alcohol and the melting peak temperature in DSC curve derived from pentadecane substantially approach or conform to each other by mixing lauryl alcohol and pentadecane with a predetermined composition ratio, so that a heat storage material composition showing a narrow width in the phase transition temperature such as near 10° C. and a stable melting temperature can be obtained.

Example 9

10. Production of a Heat Storage Material Composition and DSC Measurement: Lauryl Alcohol (C12) and Tetradecane (C14)

Lauryl alcohol (manufactured by Kao Corporation, KALCOL 2098) molten in a hot water bath of 40° C. and tetradecane (manufactured by JX Nikko Nisseki energy Co., Ltd., TS paraffin TS4) molten in an atmosphere of 23° C. were prepared. Molten lauryl alcohol and molten tetradecane were combined with each other at molar fractions shown at sample numbers 5-1 to 5-9 in Table 7, respectively, and then the combinations thereof were stirred in a hot water bath of 40° C. to obtain samples 5-1 to 5-9. In this Example 9, the lauryl alcohol produced in the same production lot was used. Similarly, the tetradecane produced in the same production lot was used in this Example 9. DSC measurements using the same instrument under the same measurement conditions as in the above-mentioned Example were performed for the obtained samples. The melting behaviors of the obtained charts were analyzed, and a melting peak temperature derived from lauryl alcohol and a melting peak temperature derived from tetradecane of each sample were obtained. Also, melting latent heat capacity of each sample was similarly obtained. The obtained results are shown in Table 7.

TABLE 7

| | Higher Alcohol | | Higher Alkane | | DSC Melting Peak Temp. (° C.) | | | Melting |
|---|---|---|---|---|---|---|---|---|
| Sample Number | Carbon Number of 12 | Mol Fraction (mol %) | Carbon Number of 14 | Mol Fraction (mol %) | Derived from Lauryl Alcohol | Derived from Tetradecane | Number of Melting Peak and Behavior | Latent Heat Capacity (mJ/mg) |
| 5-1 | Lauryl Alcohol | 10.0 | Tetradecane | 90.0 | 6.8 | 6.8 | One | 230 |
| 5-2 | Lauryl Alcohol | 17.5 | Tetradecane | 82.5 | 6.8 | 6.6 | One | 237 |
| 5-3 | Lauryl Alcohol | 30.0 | Tetradecane | 70.0 | 7.8 | 6.5 | One, Shoulder at Higher Temperature Side | 240 |
| 5-4 | Lauryl Alcohol | 36.0 | Tetradecane | 64.0 | 12.3 | 6.4 | Two | 246 |
| 5-5 | Lauryl Alcohol | 46.3 | Tetradecane | 53.7 | 15.0 | 6.2 | Two | 239 |
| 5-6 | Lauryl Alcohol | 54.2 | Tetradecane | 45.8 | 16.3 | 6.2 | Two | 232 |
| 5-7 | Lauryl Alcohol | 66.5 | Tetradecane | 33.5 | 17.8 | 5.9 | Two | 228 |
| 5-8 | Lauryl Alcohol | 77.1 | Tetradecane | 22.9 | 18.5 | 5.6 | Two | 227 |
| 5-9 | Lauryl Alcohol | 88.2 | Tetradecane | 11.8 | 21.2 | 5.3 | Two | 221 |

From Table 7, it is noted that, in samples 5-1 to 5-3, the combined lauryl alcohol and tetradecane interact to each other to form new melting peaks at positions (at temperatures), which are different from the position of the melting peak of each ingredient, and that the formed melting peaks are substantially single and the melting temperatures are stable near 7° C. It is therefore revealed that, with respect to the composition consisting of lauryl alcohol and tetradecane, if the lauryl alcohol is compounded to have a molar fraction of 10-30 mol % or the tetradecane is compounded to have a molar fraction of 90-70 mol %, the melting temperature derived from the lauryl alcohol and the melting temperature derived from the tetradecane approach or conform to each other and the melting temperature of the composition becomes to 6-8° C. Sample 5-3 has a shoulder at higher temperature side, whereas samples 5-1 and 5-2 have single melting peaks alone resulting that the melting temperatures become more stable. Therefore, with respect to the composition consisting of lauryl alcohol and tetradecane, if the lauryl alcohol is compounded to have a molar fraction of 10-17.5 mol % or the tetradecane is compounded to have a molar fraction of 90-82.5 mol %, the melting temperature derived from the lauryl alcohol and the melting temperature derived from the tetradecane conform to each other and the melting temperature of the composition is kept substantially constant (6-7° C.). As a result, it is revealed that the melting peak temperature in DSC curve derived from lauryl alcohol and the melting peak temperature in DSC curve derived from tetradecane substantially approach or conform to each other by mixing lauryl alcohol and tetradecane with a predetermined composition ratio, so that a heat storage material composition showing a narrow width in the phase transition temperature such as near 7° C. and a stable melting temperature can be obtained.

Example 10

11. Production of a Heat Storage Material Composition and DSC Measurement: 1-Decanol (C10) and Tetradecane (C14)

1-decanol (manufactured by Kao Corporation, KALCOL 1098) and tetradecane (manufactured by JX Nikko Nisseki energy Co., Ltd., TS paraffin TS4) were molten in an atmosphere of 23° C., respectively. Molten 1-decanol and molten tetradecane were combined with each other at molar fractions shown at sample numbers 6-1 to 6-7 in Table 8, respectively, and then the combinations thereof were stirred in an atmosphere of 23° C. to obtain samples 6-1 to 6-7. In this Example 10, the 1-decanol produced in the same production lot was used. Similarly, the tetradecane produced in the same production lot was used in this Example 10. DSC measurements using the same instrument under the same measurement conditions as in the above-mentioned Example were performed for the obtained samples. The melting behaviors of the obtained charts were analyzed, and a melting peak temperature derived from 1-decanol and a melting peak temperature derived from tetradecane of each sample were obtained. Also, melting latent heat capacity of each sample was similarly obtained. The obtained results are shown in Table 8.

melting temperature derived from the 1-decanol and the melting temperature derived from the tetradecane conform to each other and the melting temperature of the composition is kept substantially constant (0-2° C.). As a result, it is revealed that the melting peak temperature in DSC curve derived from 1-decanol and the melting peak temperature in DSC curve derived from tetradecane substantially approach or conform to each other by mixing 1-decanol and tetradecane with a predetermined composition ratio, so that a heat storage material composition showing a narrow width in the phase transition temperature such as near 1° C. and a stable melting temperature can be obtained.

Example 11

12. Production of a Heat Storage Material Composition and DSC Measurement: Myristyl Alcohol (C14) and Octadecane (C18)

Myristyl alcohol (manufactured by Kao Corporation, KALCOL 4098) and n-octadecane (manufactured by JX

TABLE 8

| | Higher Alcohol | | Higher Alkane | | DSC Melting Peak Temp. (° C.) | | | Melting Latent Heat Capacity (mJ/mg) |
|---|---|---|---|---|---|---|---|---|
| Sample Number | Carbon Number of 10 | Mol Fraction (mol %) | Carbon Number of 14 | Mol Fraction (mol %) | Derived from 1-decanol | Derived from Tetradecane | Number of Melting Peak and Behavior | |
| 6-1 | 1-decanol | 80.1 | Tetradecane | 19.9 | 1.2 | 1.2 | One | 230 |
| 6-2 | 1-decanol | 70.1 | Tetradecane | 29.9 | 1.4 | 0.9 | One | 225 |
| 6-3 | 1-decanol | 60.2 | Tetradecane | 39.8 | 1.6 | 1.6 | One | 225 |
| 6-4 | 1-decanol | 50.1 | Tetradecane | 49.9 | 2.2 | 2.5 | One, Shoulder at Higher Temperature Side | 219 |
| 6-5 | 1-decanol | 90.0 | Tetradecane | 10.0 | 4.3 | 0.5 | Two | 223 |
| 6-6 | 1-decanol | 40.0 | Tetradecane | 60.0 | 0.7 | 4.6 | Two | 225 |
| 6-7 | 1-decanol | 20.0 | Tetradecane | 80.0 | 0.9 | 5.7 | Two | 223 |

From Table 8, it is noted that, in samples 6-1 to 6-4, the combined 1-decanol and tetradecane interact to each other to form new melting peaks at positions (at temperatures), which are different from the position of the melting peak of each ingredient, and that the formed melting peaks are substantially single and the melting temperatures are stable near 0-3° C. It is therefore revealed that, with respect to the composition consisting of 1-decanol and tetradecane, if the 1-decanol is compounded to have a molar fraction of 50-80 mol % or the tetradecane is compounded to have a molar fraction of 50-20 mol %, the melting temperature derived from the 1-decanol and the melting temperature derived from the tetradecane approach or conform to each other and the melting temperature of the composition becomes to 0-3° C. Sample 6-4 has a shoulder at higher temperature side, whereas samples 6-1 to 6-3 have single melting peaks alone resulting that the melting temperatures become more stable. Therefore, with respect to the composition consisting of 1-decanol and tetradecane, if the 1-decanol is compounded to have a molar fraction of 60-80 mol % or the tetradecane is compounded to have a molar fraction of 40-20 mol %, the Nikko Nisseki energy Co., Ltd., TS paraffin TS8) were molten in a hot water bath of 50° C., respectively. Molten myristyl alcohol and molten octadecane were combined with each other at molar fractions shown at sample numbers 7-1 to 7-9 in Table 9, respectively, and then the combinations thereof were stirred in a hot water bath of 50° C. to obtain samples 7-1 to 7-9. In this Example 11, the myristyl alcohol produced in the same production lot was used. Similarly, the n-octadecane produced in the same production lot was used in this Example 11. DSC measurements using the same instrument under the same measurement conditions as in the above-mentioned Example were performed for the obtained samples. The melting behaviors of the obtained charts were analyzed, and a melting peak temperature derived from myristyl alcohol and a melting peak temperature derived from octadecane of each sample were obtained. Also, melting latent heat capacity of each sample was similarly obtained. The obtained results are shown in Table 9.

TABLE 9

| Sample Number | Higher Alcohol Carbon Number of 14 | Mol Fraction (mol %) | Higher Alkane Carbon Number of 18 | Mol Fraction (mol %) | DSC Melting Peak Temp. (° C.) Derived from Myristyl Alcohol | Derive from Octadecane | Number of Melting Peak and Behavior | Melting Latent Heat Capacity (mJ/mg) |
|---|---|---|---|---|---|---|---|---|
| 7-1 | Myristyl Alcohol | 10.0 | Octadecane | 90.0 | 27.5 | 27.5 | One | 247 |
| 7-2 | Myristyl Alcohol | 20.0 | Octadecane | 80.0 | 27.2 | 27.2 | One | 245 |
| 7-3 | Myristyl Alcohol | 30.0 | Octadecane | 70.0 | 26.8 | 26.8 | One | 248 |
| 7-4 | Myristyl Alcohol | 39.8 | Octadecane | 60.2 | 26.8 | 26.8 | One | 240 |
| 7-5 | Myristyl Alcohol | 50.0 | Octadecane | 50.0 | 30.1 | 26.7 | Two | 239 |
| 7-6 | Myristyl Alcohol | 60.0 | Octadecane | 40.0 | 32.0 | 26.6 | Two | 231 |
| 7-7 | Myristyl Alcohol | 70.0 | Octadecane | 30.0 | 33.2 | 26.5 | Two | 229 |
| 7-8 | Myristyl Alcohol | 80.0 | Octadecane | 20.0 | 34.8 | 26.2 | Two | 222 |
| 7-9 | Myristyl Alcohol | 89.7 | Octadecane | 10.3 | 36.4 | 26.1 | Two | 219 |

From Table 9, it is noted that, in samples 7-1 to 7-4, the combined myristyl alcohol and octadecane interact to each other to form new melting peaks at positions (at temperatures), which are different from the position of the melting peak of each ingredient, and that the formed melting peaks are substantially single and the melting temperatures are stable near 27° C. It is therefore revealed that, with respect to the composition consisting of myristyl alcohol and octadecane, if the myristyl alcohol is compounded to have a molar fraction of 10-40 mol % or the octadecane is compounded to have a molar fraction of 90-60 mol %, the melting temperature derived from the myristyl alcohol and the melting temperature derived from the octadecane approach or conform to each other and the melting temperature of the composition becomes to 26-28° C. As a result, it is revealed that the melting peak temperature in DSC curve derived from myristyl alcohol and the melting peak temperature in DSC curve derived from octadecane substantially approach or conform to each other by mixing myristyl alcohol and octadecane with a predetermined composition ratio, so that a heat storage material composition showing a narrow width in the phase transition temperature such as near 27° C. and a stable melting temperature can be obtained.

Example 12

13. Production of a Heat Storage Material Composition and DSC Measurement: Myristyl Alcohol (C14) and Eicosane (C20)

Myristyl alcohol (manufactured by Kao Corporation, KALCOL 4098) and n-eicosane (manufactured by JX Nikko Nisseki energy Co., Ltd., TS paraffin TS20) were molten in a hot water bath of 50° C., respectively. Molten myristyl alcohol and molten eicosane were combined with each other at molar fractions shown at sample numbers 8-1 to 8-9 in Table 10, respectively, and then the combinations thereof were stirred in a hot water bath of 50° C. to obtain samples 8-1 to 8-9. In this Example 12, the myristyl alcohol produced in the same production lot was used. Similarly, the n-eicosane produced in the same production lot was used in this Example 12. DSC measurements using the same instrument under the same measurement conditions as in the above-mentioned Example were performed for the obtained samples. The melting behaviors of the obtained charts were analyzed, and a melting peak temperature derived from myristyl alcohol and a melting peak temperature derived from eicosane of each sample were obtained. Also, melting latent heat capacity of each sample was similarly obtained. The obtained results are shown in Table 10.

TABLE 10

| Sample Number | Higher Alcohol Carbon Number of 14 | Mol Fraction (mol %) | Higher Alkane Carbon Number of 20 | Mol Fraction (mol %) | DSC Melting Peak Temp. (° C.) Derived from Myristyl Alcohol | Derived from Eicosane | Number of Melting Peak and Behavior | Melting Latent Heat Capacity (mJ/mg) |
|---|---|---|---|---|---|---|---|---|
| 8-1 | Myristyl Alcohol | 70.0 | Eicosane | 30.0 | 31.5 | 31.5 | One | 204.7 |
| 8-2 | Myristyl Alcohol | 60.0 | Eicosane | 40.0 | 31.5 | 31.5 | One | 210.3 |
| 8-3 | Myristyl Alcohol | 50.0 | Eicosane | 50.0 | 31.5 | 31.5 | One | 206.0 |
| 8-4 | Myristyl Alcohol | 40.1 | Eicosane | 59.9 | 31.0 | 32.7 | One, Shoulder at Higher Temperature side | 206.5 |
| 8-5 | Myristyl Alcohol | 20.0 | Eicosane | 80.0 | 29.2 | 33.8 | Two | 206.9 |
| 8-6 | Myristyl Alcohol | 94.8 | Eicosane | 5.2 | 36.4 | 30.5 | Two | 213.7 |
| 8-7 | Myristyl Alcohol | 89.9 | Eicosane | 10.1 | 35.8 | 31.0 | Two | 212.1 |
| 8-8 | Myristyl Alcohol | 85.0 | Eicosane | 15.0 | 34.6 | 31.0 | Two | 210.9 |
| 8-9 | Myristyl Alcohol | 79.9 | Eicosane | 20.1 | 33.8 | 31.2 | Two | 208.0 |

From Table 10, it is noted that, in samples 8-1 to 8-4, the combined myristyl alcohol and eicosane interact to each other to form new melting peak at positions (at temperatures), which are different from the position of the melting peak of each ingredient, and that the formed melting peaks are substantially single and the melting temperatures are stable near 31.5° C. It is therefore revealed that, with respect to the composition consisting of myristyl alcohol and eicosane, if the myristyl alcohol is compounded to have a molar fraction of 40-70 mol % or the eicosane is compounded to have a molar fraction of 60-30 mol %, the melting temperature derived from the myristyl alcohol and the melting temperature derived from the eicosane approach or conform to each other and the melting temperature of the composition becomes to 30-33° C. As a result, it is revealed that the melting peak temperature in DSC curve derived from myristyl alcohol and the melting peak temperature in DSC curve derived from eicosane substantially approach or conform to each other by mixing myristyl alcohol and eicosane with a predetermined composition ratio, so that a heat storage material composition showing a narrow width in the phase transition temperature such as near 31.5° C. and a stable melting temperature can be obtained.

Example 13

14. Production of a Heat Storage Material Composition and DSC Measurement: Myristyl Alcohol (C14) and Docosane (C22)

Myristyl alcohol (manufactured by Kao Corporation, KALCOL 4098) and n-docosane (manufactured by Wako Pure Chemical Industries, Ltd., Docosane) were molten in a hot water bath of 60° C., respectively. Molten myristyl alcohol and molten docosane were combined with each other at molar fractions shown at sample numbers 9-1 to 9-9 in Table 11, respectively, and then the combinations thereof were stirred in a hot water bath of 60° C. to obtain samples 9-1 to 9-9. In this Example 13, the myristyl alcohol produced in the same production lot was used. Similarly, the n-docosane produced in the same production lot was used in this Example 13. DSC measurements using the same instrument under the same measurement conditions as in the above-mentioned Example were performed for the obtained samples. The melting behaviors of the obtained charts were analyzed, and a melting peak temperature derived from myristyl alcohol and a melting peak temperature derived from docosane of each sample were obtained. Also, melting latent heat capacity of each sample was similarly obtained. The obtained results are shown in Table 11.

to the composition consisting of myristyl alcohol and docosane, if the myristyl alcohol is compounded to have a molar fraction of 72-95 mol % or the docosane is compounded to have a molar fraction of 28-5 mol %, the melting temperature derived from the myristyl alcohol and the melting temperature derived from the docosane approach or conform to each other and the melting temperature of the composition becomes to 34-37° C. As a result, it is revealed that the melting peak temperature in DSC curve derived from myristyl alcohol and the melting peak temperature in DSC curve derived from docosane substantially approach or conform to each other by mixing myristyl alcohol and docosane with a predetermined composition ratio, so that a heat storage material composition showing a narrow width in the phase transition temperature such as near 35° C. and a stable melting temperature can be obtained.

Example 14

15. Production of a Heat Storage Material Composition and DSC Measurement: Cetyl Alcohol (C16) and Eicosane (C20)

Cetyl alcohol (manufactured by Kao Corporation, KALCOL 6098) and n-eicosane (manufactured by JX Nikko Nisseki energy Co., Ltd., TS paraffin TS20) were molten in a hot water bath of 50° C., respectively. Molten cetyl alcohol and molten eicosane were combined with each other at molar fractions shown at sample numbers 10-1 to 10-9 in Table 12, respectively, and then the combinations thereof were stirred in a hot water bath of 50° C. to obtain samples 10-1 to 10-9. In this Example 14, the cetyl alcohol produced in the same production lot was used. Similarly, the n-eicosane produced in the same production lot was used in this Example 14. DSC measurements using the same instrument under the same measurement conditions as in the above-mentioned Example were performed for the obtained samples. The melting behaviors of the obtained charts were analyzed, and a melting peak temperature derived from cetyl alcohol and a melting peak temperature derived from eicosane of each sample were obtained. Also, melting latent heat capacity of each sample was similarly obtained. The obtained results are shown in Table 12.

TABLE 11

| | Higher Alcohol | | Higher Alkane | | DSC Melting Peak Temp. (° C.) | | | Melting |
|---|---|---|---|---|---|---|---|---|
| Sample Number | Carbon Number of 14 | Mol Fraction (mol %) | Carbon Number of 22 | Mol Fraction (mol %) | Derived from Myristyl Alcohol | Derived from Docosane | Number of Melting Peak and Behavior | Latent Heat Capacity (mJ/mg) |
| 9-1 | Myristyl Alcohol | 95.3 | Docosane | 4.7 | 36.5 | 34.5 | One, Shoulder at Lower Temperature Side | 220.5 |
| 9-2 | Myristyl Alcohol | 90.8 | Docosane | 9.2 | 35.4 | 35.4 | One | 220.0 |
| 9-3 | Myristyl Alcohol | 86.3 | Docosane | 13.7 | 35.1 | 35.1 | One | 215.6 |
| 9-4 | Myristyl Alcohol | 81.5 | Docosane | 18.5 | 35.1 | 35.1 | One | 213.0 |
| 9-5 | Myristyl Alcohol | 72.4 | Docosane | 27.6 | 35.1 | 35.1 | One | 229.0 |
| 9-6 | Myristyl Alcohol | 63.8 | Docosane | 36.2 | 35.1 | 40.4 | Two | 226.4 |
| 9-7 | Myristyl Alcohol | 52.6 | Docosane | 47.4 | 35.1 | 40.7 | Two | 230.0 |
| 9-8 | Myristyl Alcohol | 42.5 | Docosane | 57.5 | 34.9 | 41.2 | Two | 235.0 |
| 9-9 | Myristyl Alcohol | 21.9 | Docosane | 78.1 | 34.4 | 42.5 | Two | 241.0 |

From Table 11, it is noted that, in samples 9-1 to 9-5, the combined myristyl alcohol and docosane interact to each other to form new melting peaks at positions (at temperatures), which are different from the position of the melting peak of each ingredient, and that the formed melting peaks are substantially single and the melting temperatures are stable near 35° C. It is therefore revealed that, with respect

TABLE 12

| | Higher Alcohol | | Higher Alkane | | DSC Melting Peak Temp. (° C.) | | | Melting Latent Heat |
|---|---|---|---|---|---|---|---|---|
| Sample Number | Carbon Number of 16 | Mol Fraction (mol %) | Carbon Number of 20 | Mol Fraction (mol %) | Derived from Cetyl Alcohol | Derived from Eicosane | Number of Melting Peak and Behavior | Capacity (mJ/mg) |
| 10-1 | Cetyl Alcohol | 9.9 | Eicosane | 90.1 | 34.1 | 34.1 | One | 210.0 |
| 10-2 | Cetyl Alcohol | 19.9 | Eicosane | 80.1 | 34.1 | 34.1 | One | 207.4 |
| 10-3 | Cetyl Alcohol | 29.7 | Eicosane | 70.3 | 38.1 | 34.1 | One, Shoulder at Higher Temperature Side | 210.1 |
| 10-4 | Cetyl Alcohol | 39.9 | Eicosane | 60.1 | 39.8 | 33.9 | Two | 213.0 |
| 10-5 | Cetyl Alcohol | 50.1 | Eicosane | 49.9 | 41.4 | 33.9 | Two | 211.9 |
| 10-6 | Cetyl Alcohol | 60.0 | Eicosane | 40.0 | 43.1 | 33.9 | Two | 204.6 |
| 10-7 | Cetyl Alcohol | 69.3 | Eicosane | 30.7 | 44.2 | 34.0 | Two | 212.8 |
| 10-8 | Cetyl Alcohol | 80.1 | Eicosane | 19.9 | 45.6 | 33.6 | Two | 207.2 |
| 10-9 | Cetyl Alcohol | 89.3 | Eicosane | 10.7 | 47.2 | 33.6 | Two | 205.6 |

From Table 12, it is noted that, in samples 10-1 to 10-3, the combined cetyl alcohol and eicosane interact to each other to form new melting peaks at positions (at temperatures), which are different from the position of the melting peak of each ingredient, and that the formed melting peaks are substantially single and the melting temperatures are stable near 34° C. It is therefore revealed that, with respect to the composition consisting of cetyl alcohol and eicosane, if the cetyl alcohol is compounded to have a molar fraction of 10-30 mol % or the eicosane is compounded to have a molar fraction of 90-70 mol %, the melting temperature derived from the cetyl alcohol and the melting temperature derived from the eicosane approach or conform to each other and the melting temperature of the composition becomes to 34-38° C. As a result, it is revealed that the melting peak temperature in DSC curve derived from cetyl alcohol and the melting peak temperature in DSC curve derived from eicosane substantially approach or conform to each other by mixing cetyl alcohol and eicosane with a predetermined composition ratio, so that a heat storage material composition showing a narrow width in the phase transition temperature such as near 34° C. and a stable melting temperature can be obtained.

Example 15

16. Production of a Heat Storage Material Composition and DSC Measurement: Cetyl Alcohol (C16) and Docosane (C22)

Cetyl alcohol (manufactured by Kao Corporation, KAL-COL 6098) and n-docosane (manufactured by Wako Pure Chemical Industries, Ltd., Docosane) were molten in a hot water bath of 60° C., respectively. Molten cetyl alcohol and molten docosane were combined with each other at molar fractions shown at sample numbers 11-1 to 11-5 in Table 13, respectively, and then the combinations thereof were stirred in a hot water bath of 60° C. to obtain samples 11-1 to 11-5. In this Example 15, the cetyl alcohol produced in the same production lot was used. Similarly, the n-docosane produced in the same production lot was used in this Example 15. DSC measurements using the same instrument under the same measurement conditions as in the above-mentioned Example were performed for the obtained samples. The melting behaviors of the obtained charts were analyzed, and a melting peak temperature derived from cetyl alcohol and a melting peak temperature derived from docosane of each sample were obtained. Also, melting latent heat capacity of each sample was similarly obtained. The obtained results are shown in Table 13.

TABLE 13

| | Higher Alcohol | | Higher Alkane | | DSC Melting Peak Temp. (° C.) | | | Melting Latent Heat |
|---|---|---|---|---|---|---|---|---|
| Sample Number | Carbon Number of 16 | Mol Fraction (mol %) | Carbon Number of 22 | Mol Fraction (mol %) | Derived from Cetyl Alcohol | Derived from Docosane | Number of Melting Peak and Behavior | Capacity (mJ/mg) |
| 11-1 | Cetyl Alcohol | 60.1 | Docosane | 39.9 | 43.2 | 41.1 | One, Shoulder at Higher Temperature Side | 233.0 |
| 11-2 | Cetyl Alcohol | 50.0 | Docosane | 50.0 | 41.3 | 41.3 | One | 237.0 |
| 11-3 | Cetyl Alcohol | 40.0 | Docosane | 60.0 | 41.6 | 41.6 | One | 240.0 |
| 11-4 | Cetyl Alcohol | 30.1 | Docosane | 69.9 | 39.0 | 41.8 | Two | 230.0 |
| 11-5 | Cetyl Alcohol | 80.1 | Docosane | 19.9 | 45.8 | 40.7 | Two | 227.0 |

From Table 13, it is noted that, in samples 11-1 to 11-3, the combined cetyl alcohol and docosane interact to each other to form new melting peaks at positions (at temperatures), which are different from the position of the melting peak of each ingredient, and that the formed melting peaks are substantially single and the melting temperatures are stable near 41° C. It is therefore revealed that, with respect to the composition consisting of cetyl alcohol and docosane, if the cetyl alcohol is compounded to have a molar fraction of 40-60 mol % or the docosane is compounded to have a molar fraction of 60-40 mol %, the melting temperature derived from the cetyl alcohol and the melting temperature derived from the docosane approach or conform to each other and the melting temperature of the composition becomes to 41-44° C. As a result, it is revealed that the melting peak temperature in DSC curve derived from cetyl alcohol and the melting peak temperature in DSC curve derived from docosane substantially approach or conform to each other by mixing cetyl alcohol and docosane with a predetermined composition ratio, so that a heat storage material composition showing a narrow width in the phase transition temperature such as near 41° C. and a stable melting temperature can be obtained.

Example 16

17. Production of a Heat Storage Material (Heat Storage Material 1)

Lauryl alcohol (a) (manufactured by Kao Corporation, KALCOL 2098) of 812 g molten in a hot water bath of 40° C. and octadecane (b) (manufactured by JX Nikko Nisseki energy Co., Ltd., TS paraffin TS8) of 196 g molten in a hot water bath of 40° C. were stirred and mixed in a hot water bath of 40° C., and thus a compound liquid of lauryl alcohol with a molar fraction of about 85.0 mol % and octadecane with a molar fraction of about 15.0 mol % was obtained. Hydroxypropyl cellulose (manufactured by Nippon Soda Co., Ltd., NISSOH HPC-H) of 42 g that is a gelling agent was added to the obtained compound liquid and the added compound liquid was stirred in a hot water bath of 40° C. for about 10 minutes so as to well scatter the added gelling agent to obtain a heat storage material composition. Then, 1000 g of this heat storage material composition was filled in a blow container (width of 180 mm×length of 280 mm×thickness of 32 mm) made of chloroethylene to obtain a heat storage material 1 shown in Table 14. By performing an examination for repeating 100 times of heat cycles between −20° C. and 60° C., it was confirmed that the obtained heat storage material 1 had a stable property without producing solid-liquid separation and showed no decrease in the melting latent heat capacity, namely the capacity changed from 212 mJ/mg to 217 mJ/mg.

(Heat Storage Material 2)

Heat storage material 2 shown in Table 14 was obtained through the similar processes except that lauryl alcohol (c) was used instead of the lauryl alcohol (a). By performing an examination for repeating 100 times of heat cycles between −20° C. and 60° C., it was confirmed that the obtained heat storage material 2 had a stable property without producing solid-liquid separation and showed no decrease in the melting latent heat capacity, namely the capacity changed from 215 mJ/mg to 222 mJ/mg.

(Heat Storage Material 3)

1-decanol (f) (manufactured by Kao Corporation, KALCOL 1098) of 870 g and hexadecane (j) (manufactured by JX Nikko Nisseki energy Co., Ltd., TS paraffin TS6) of 138 g were stirred and mixed in an atmosphere of 23° C., and thus a compound liquid of 1-decanol with a molar fraction of about 90 mol % and hexadecane with a molar fraction of about 10 mol % was obtained. Hydroxypropyl cellulose (manufactured by Nippon Soda Co., Ltd., NISSOH HPC-H) of 42 g that is a gelling agent was added to the obtained compound liquid and the added compound liquid was stirred for about 10 minutes so as to well scatter the added gelling agent to obtain a heat storage material composition. Then, 1000 g of this heat storage material composition was filled in a blow container similar to the above container to obtain a heat storage material 3 shown in Table 14. By performing an examination for repeating 100 times of heat cycles between −20° C. and 60° C., it was confirmed that the obtained heat storage material 3 had a stable property without producing solid-liquid separation and showed little decrease in the melting latent heat capacity, namely the capacity changed from 200 mJ/mg to 198 mJ/mg.

(Heat Storage Materials 4 and 5)

As shown in Table 14, heat storage materials 4 and 5 were produced only from lauryl alcohol (a) or lauryl alcohol (c) (manufactured by Kao Corporation, KALCOL 2098, (a) and (c) only differ in their production lots). Lauryl alcohol of 1008 g was molten in a hot water bath of 40° C. Hydroxypropyl cellulose (manufactured by Nippon Soda Co., Ltd., NISSOH HPC-H) of 42 g was added to the obtained compound liquid and the added compound liquid was stirred in a hot water bath of 40° C. for about 10 minutes so as to well scatter the added gelling agent to obtain a heat storage material composition. Then, 1000 g of these heat storage material compositions were filled in a blow container (width of 180 mm×length of 280 mm×thickness of 32 mm) made of chloroethylene to obtain the heat storage materials 4 and 5 as Comparative Examples 2 and 3 shown in Table 14.

(Heat Storage Materials 6 and 7)

As shown in Table 14, 1000 g of a commercial heat storage material composition (based on polyethylene glycol) with a melting temperature or a solidification temperature near 20° C. was filled in a blow container (width of 180 mm×length of 280 mm×thickness of 32 mm) made of chloroethylene to obtain the heat storage material 6 as a Comparative Example 4. Similarly, a commercial heat storage material composition (based on polyethylene glycol) with a melting temperature or a solidification temperature near 5° C. was filled in the blow container to obtain the heat storage material 7 as a Comparative Example 5.

TABLE 14

| Heat Storage Material Number | Heat Storage Material Composition (mol %) | |
|---|---|---|
| 1 | Lauryl Alcohol (a) 85.0% | Octadecane (b) 15.0% |
| 2 | Lauryl Alcohol (c) 85.0% | Octadecane (b) 15.0% |
| 3 | 1-decanol (f) 90.0% | Hexadecane (j) 10.0% |
| 4 | Lauryl Alcohol (a) 100% | |
| 5 | Lauryl Alcohol (c) 100% | |
| 6 | PEG Family 100% Melting Point of 20° C. | |
| 7 | PEG Family 100% Melting Point of 5° C. | |

In the following Examples and Comparative Examples, the heat storage materials 1-6 were accommodated in insulation containers to form transport containers, respectively, and then performance test thereof were executed.

Example 17

18. Manufacture of Transport Containers and Performance Test: Heat Storage Material 1

Figure 43:
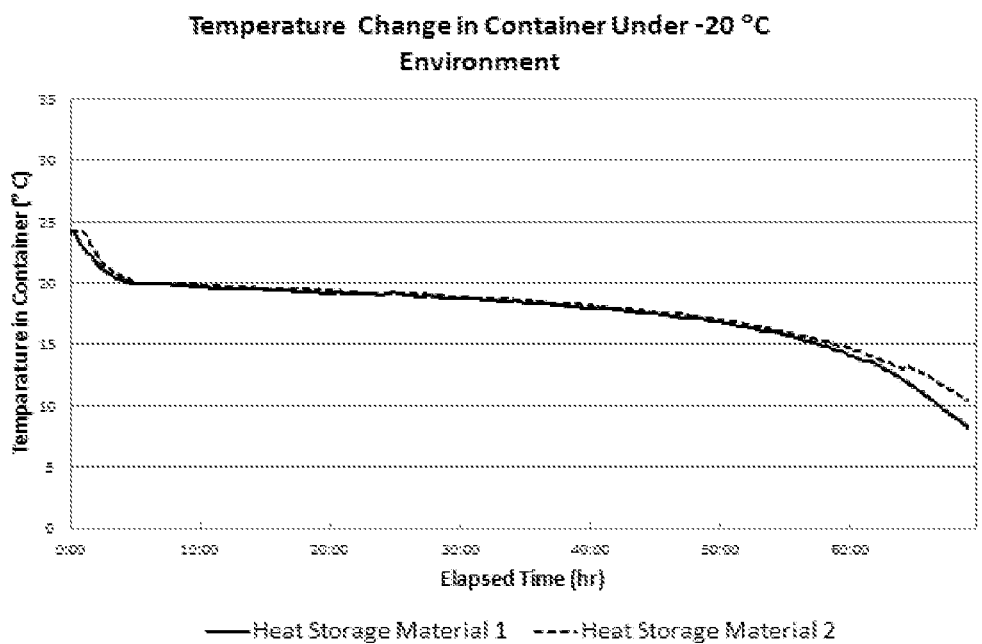
FIG. 43 is a graph showing the temperature change in the transport container under the environmental temperature of −20° C. condition in Example 17 and in Example 18.
Figure 44:
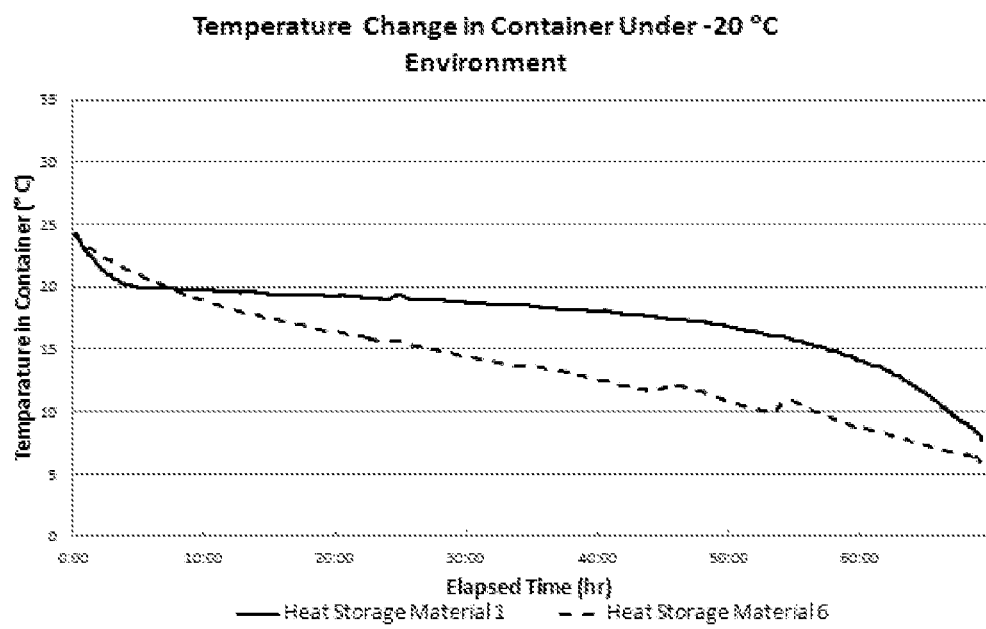
FIG. 44 is a graph showing the temperature change in the transport container under the environmental temperature of −20° C. condition in Example 17 and in Comparative Example 4.
Figure 45:
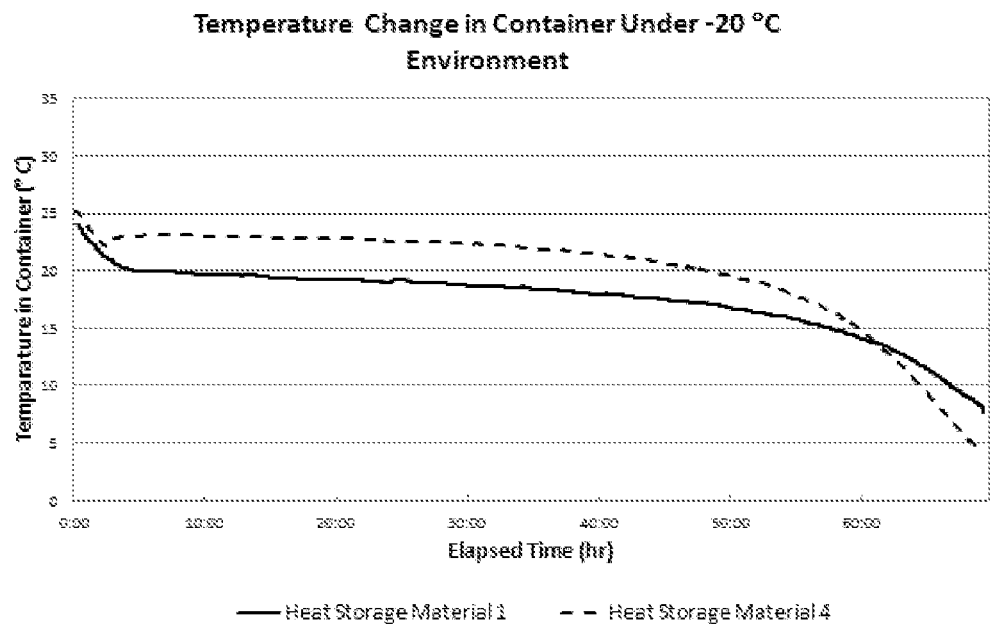
FIG. 45 is a graph showing the temperature change in the transport container under the environmental temperature of −20° C. condition in Example 17 and in Comparative Example 2.

Transport containers shown in FIGS. 41 and 42 were manufactured by using the heat storage materials 1 produced in Example 16. As for the transport container, an insulation box 41 made of expanded polystyrene (manufactured by Tamai Kasei Co., Ltd., AC-525) with outer dimension (width of 620 mm×depth of 420 mm×height of 470 mm), inner dimension (width of 500 mm×depth of 300 mm×height of 350 mm), insulation thickness of 60 mm, and inner capacity of approximately 52.5 L was used. At first, 12 heat storage materials 1 were left at rest in a thermostatic chamber of 25° C. for 24 hours, to make the materials in melting state. Then, as shown in FIGS. 41 and 42, the 12 heat storage materials 1 were arranged in the insulation box 41 so as to circle round a space 5 for containing temperature-regulation required articles. Four of the total 12 heat storage materials 1 were located on the bottom surface 411, two were located on each side surface 412, and four were located near the opening 410. Each transport container was obtained by attaching a temperature data logger (manufactured by T & D Corporation, RTR-51) in the center of the insulation box 41, and by closing the opening with the cover 42. The obtained transport containers were set in a built-in chamber kept at −20° C. and temperature changes in the center of the container were measured every 5 minutes. FIGS. 43-45 show graphs of transition of the temperature change in the transport containers when the transport containers containing the heat storage material 1 were located in the −20° C. environment. The vertical axis in the figure indicates temperature in the transport container (° C.) and the lateral axis indicates an elapsed time (hours) after the transport container is set in the built-in chamber.

Figure 47:
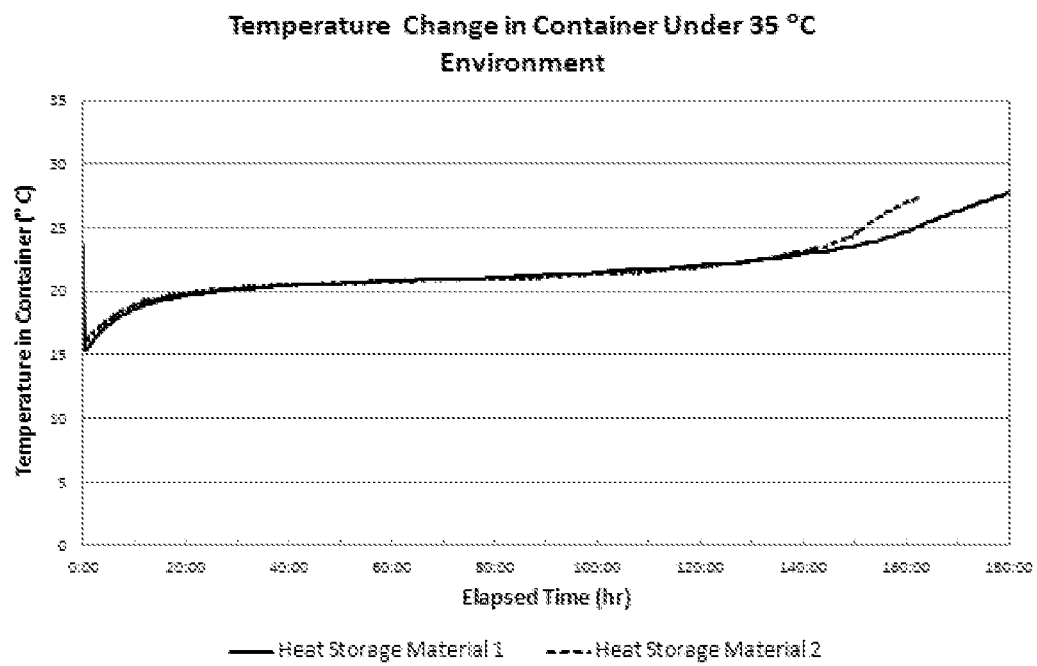
FIG. 47 is a graph showing the temperature change in the transport container under the environmental temperature of 35° C. condition in Example 17 and in Example 18.
Figure 48:
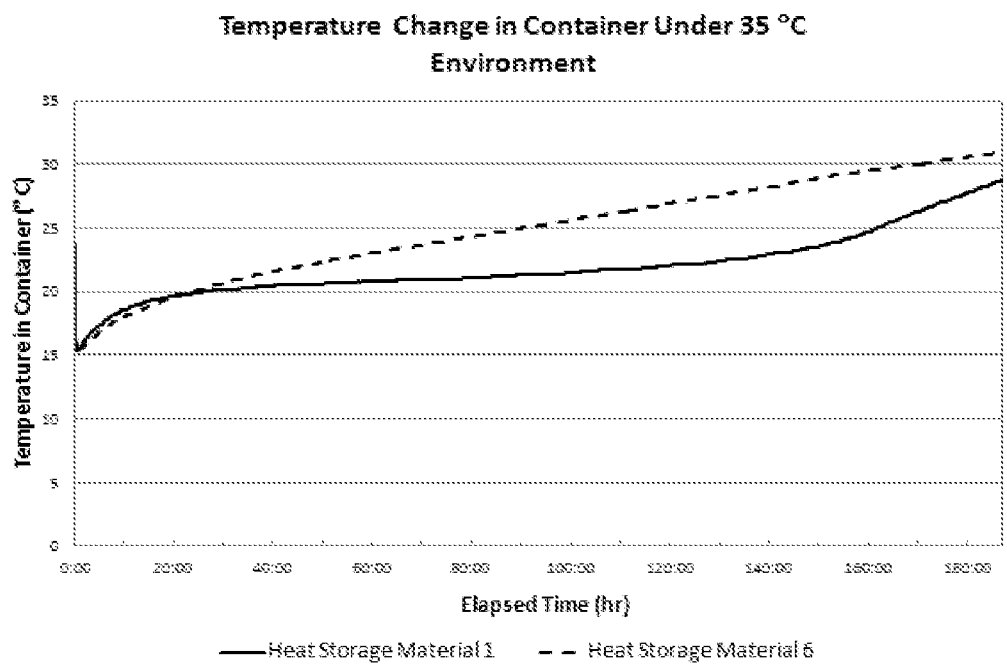
FIG. 48 is a graph showing the temperature change in the transport container under the environmental temperature of 35° C. condition in Example 17 and in Comparative Example 4.
Figure 49:
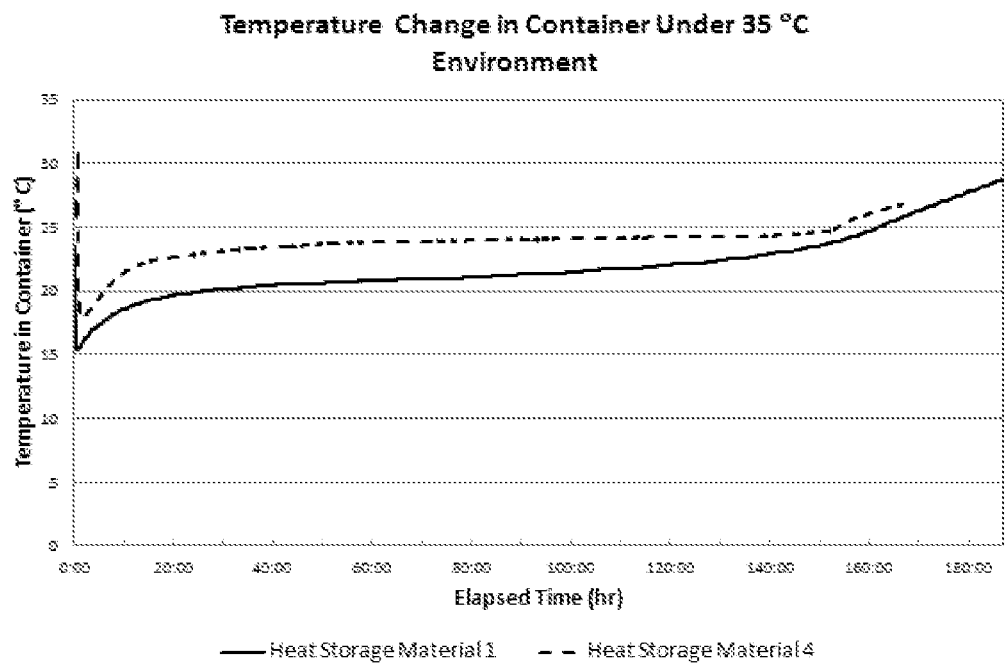
FIG. 49 is a graph showing the temperature change in the transport container under the environmental temperature of 35° C. condition in Example 17 and in Comparative Example 2.

Transport container were manufactured in the similar processes as in aforementioned Example except that the heat storage materials 1 before packing were left at rest in a thermostatic chamber of 15° C. for 24 hours. The manufactured transport containers were set in a built-in chamber kept at 35° C. and temperature changes in the center of the containers were measured every 5 minutes. FIGS. 47-49 show graphs of transition of the temperature change in the transport containers when the transport containers containing the heat storage materials 1 were located in the 35° C. environment. The vertical axis in the figure indicates temperature in the transport container (° C.) and the lateral axis indicates an elapsed time (hours) after the transport container is set in the built-in chamber.

Example 18

19. Manufacture of Transport Containers and Performance Test: Heat Storage Material 2

Transport containers were manufactured in the similar processes as in Example 17 except that the heat storage materials 2 were used instead of the heat storage materials 1, respectively, and temperature changes in the center of the containers were measured. FIG. 43 shows a graph of transition of the temperature change in the transport containers when the transport containers containing the heat storage material 2 were located in the −20° C. environment. Also, FIG. 47 shows a graph of transition of the temperature change in the transport containers when the transport containers containing the heat storage material 2 were located in the 35° C. environment.

Example 19

20. Manufacture of Transport Containers and Performance Test: Heat Storage Material 3

Figure 51:
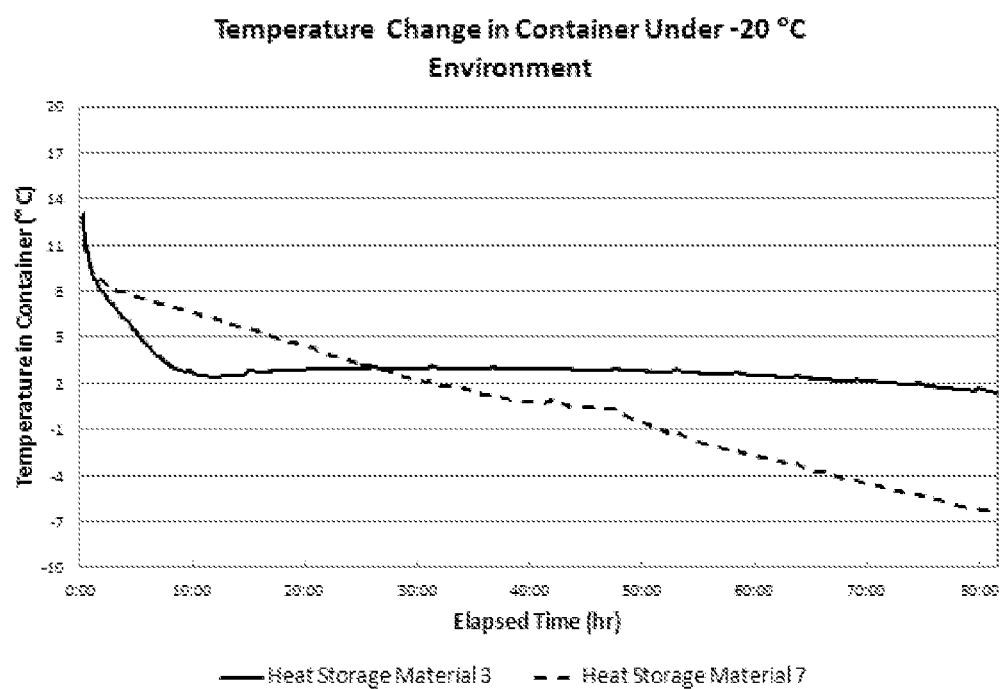
FIG. 51 is a graph showing the temperature change in the transport container under the environmental temperature of −20° C. condition in Example 19 and in Comparative Example 5.
Figure 52:
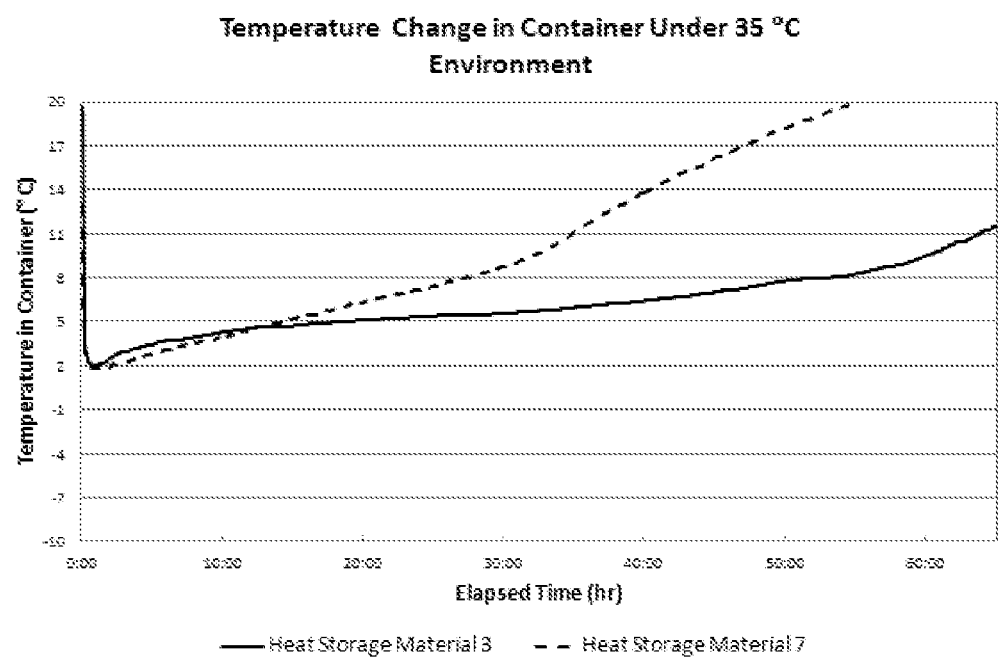
FIG. 52 is a graph showing the temperature change in the transport container under the environmental temperature of 35° C. condition in Example 19 and in Comparative Example 5.

Transport containers were manufactured in the similar processes as in Example 17 except that the heat storage materials 3 were used instead of the heat storage materials 1, respectively, and temperature changes in the center of the containers were measured. FIG. 51 shows a graph of transition of the temperature change in the transport containers when the transport containers containing the heat storage materials 3 were located in the −20° C. environment. Also, FIG. 52 shows a graph of transition of the temperature change in the transport containers when the transport containers containing the heat storage materials 3 were located in the 35° C. environment.

Comparative Example 2

21. Manufacture of Transport Containers and Performance Test: Heat Storage Material 4

Figure 50:
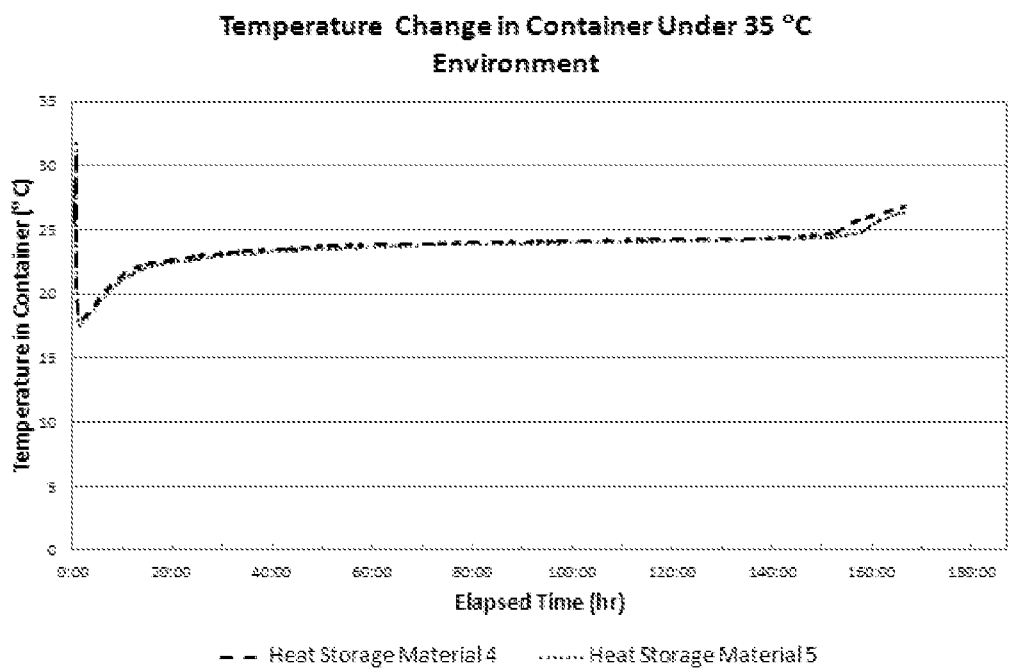
FIG. 50 is a graph showing the temperature change in the transport container under the environmental temperature of 35° C. condition in Comparative Example 2 and in Comparative Example 3.

Transport containers were manufactured in the similar processes as in Example 17 except that the heat storage materials 4 were used instead of the heat storage materials 1, respectively, and temperature changes in the center of the containers were measured. FIGS. 49 and 50 show graphs of transition of the temperature change in the transport containers when the transports container containing the heat storage materials 4 were located in the 35° C. environment.

Comparative Example 3

22. Manufacture of Transport Containers and Performance Test: Heat Storage Material 5

Figure 46:
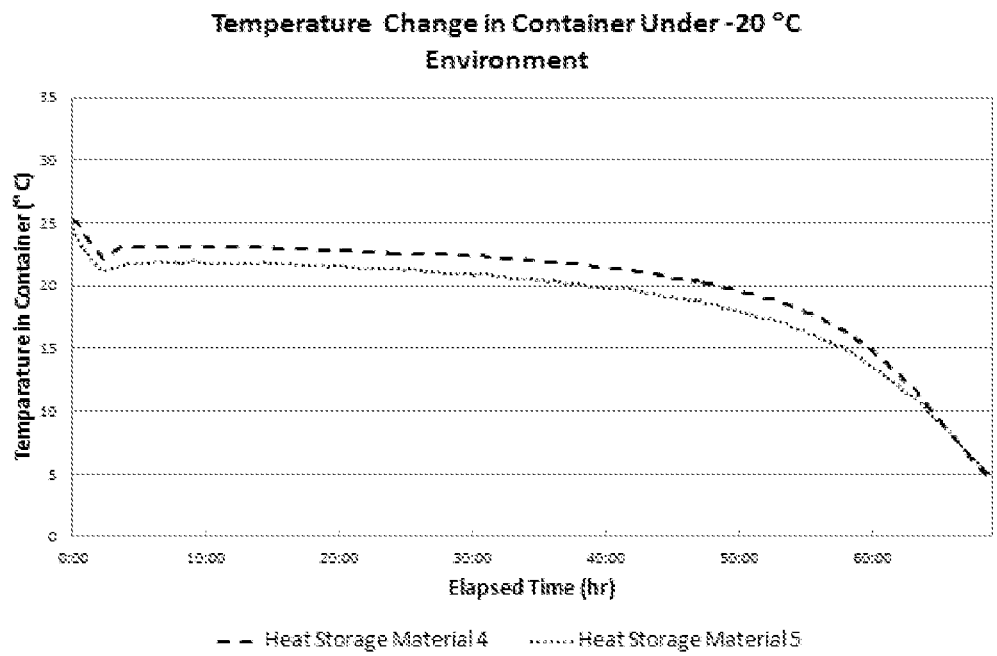
FIG. 46 is a graph showing the temperature change in the transport container under the environmental temperature of −20° C. condition in Comparative Example 2 and in Comparative Example 3.

Transport containers were manufactured in the similar processes as in Example 17 except that the heat storage materials 5 were used instead of the heat storage materials 1, respectively, and temperature changes in the center of the containers were measured. FIG. 46 shows a graph of transition of the temperature change in the transport containers when the transport containers containing the heat storage materials 5 were located in the −20° C. environment. Also, FIG. 50 shows a graph of transition of the temperature change in the transport containers when the transport containers containing the heat storage materials 5 were located in the 35° C. environment.

Comparative Example 4

23. Manufacture of Transport Containers and Performance Test: Heat Storage Material 6

Transport containers were manufactured in the similar processes as in Example 17 except that the heat storage materials 6 were used instead of the heat storage materials 1, respectively, and temperature changes in the center of the containers were measured. FIG. 44 shows a graph of transition of the temperature change in the transport containers when the transport containers containing the heat storage materials 6 were located in the −20° C. environment. Also, FIG. 48 shows a graph of transition of the temperature change in the transport containers when the transport containers containing the heat storage materials 6 were located in the 35° C. environment.

Comparative Example 5

24. Manufacture of Transport Containers and Performance Test: Heat Storage Material 7

Transport containers were manufactured in the similar processes as in Example 17 except that the heat storage materials 7 were used instead of the heat storage materials 1, respectively, and that the heat storage materials 7 before packing were left at rest in a thermostatic chamber of 15° C. for 24 hours. The manufactured transport containers were set in a built-in chamber kept at −20° C. and temperature changes in the center of the containers were measured every 5 minutes. Also, transport containers were manufactured in the similar processes as in Example 17 except that the heat storage materials 7 before packing were left at rest in a thermostatic chamber of −2° C. for 24 hours. The manufactured transport containers were set in a built-in chamber kept at 35° C. and temperature changes in the center of the containers were measured every 5 minutes. FIG. 51 shows a graph of transition of the temperature change in the transport containers when the transport containers containing the heat storage materials 7 were located in the −20° C. environment. Furthermore, FIG. 52 shows a graph of transition of the temperature change in the transport containers when the transport containers containing the heat storage materials 7 were located in the 35° C. environment.

Shown in Table 15 are temperature keeping times for keeping the transport containers containing the heat storage materials 1-5, respectively, within a predetermined management temperature range (20° C.±5° C. or 20° C.±2.5° C.) when the transport containers were located under the −20° C. environment, obtained as a result of measurement of Examples 17-19 and Comparative Examples 2-5. Also, shown in Table 16 are temperature keeping times for keeping the transport containers containing the heat storage materials 1-5, respectively, within a predetermined temperature range (20° C.±5° C. or 20° C.±2.5° C.) when the transport containers were located under the 35° C. environment. On the other hands, temperature keeping time for keeping the transport container containing the heat storage material 3 or 7, within a predetermined temperature range (5° C.±3° C. or 4° C.±2° C.) when the transport container was located under the −20° C. environment is shown in Table 17. Also, temperature keeping time for keeping the transport container containing the heat storage material 3 or 7, within a predetermined temperature range (5° C.±3° C. or 4° C.±2° C.) when the transport container was located under the 35° C. environment is shown in Table 18.

TABLE 17

| Temperature in Container Under −20° C. Environment | Heat Storage Material 3 1-decanol (f) Hexadecane (j) | Heat Storage Material 7 PEG (Melting Point of 5° C.) |
|---|---|---|
| Temperature Keeping Time for Keeping Temperature within 2° C.-8° C. | 83 hours and 15 minutes | 28 hours and 20 minutes |
| Temperature Keeping Time for Keeping Temperature within 3° C.-6° C. | 30 hours and 10 minutes | 14 hours and 00 minutes |

TABLE 18

| Temperature in Container Under 35° C. Environment | Heat Storage Material 3 1-decanol (f) Hexadecane (j) | Heat Storage Material 7 PEG (Melting Point of 5° C.) |
|---|---|---|
| Temperature Keeping Time for Keeping Temperature within 2° C.-8° C. | 53 hours and 15 minutes | 25 hours and 10 minutes |
| Temperature Keeping Time for Keeping Temperature within 3° C.-6° C. | 33 hours and 05 minutes | 13 hours and 05 minutes |

TABLE 15

| Temperature in Container Under −20° C. Environment | Heat Storage Material 1 Lauryl Alcohol (a) Octadecane (b) | Heat Storage Material 2 Lauryl Alcohol (c) Octadecane (b) | Heat Storage Material 3 Lauryl Alcohol (a) | Heat Storage Material 4 Lauryl Alcohol (c) | Heat Storage Material 5 PEG (Melting Point of 20° C.) |
|---|---|---|---|---|---|
| Temperature Keeping Time for Keeping Temperature within 15° C.-25° C. | 57 hours and 35 minutes | 53 hours and 55 minutes | 59 hours and 25 minutes | 57 hours and 55 minutes | 27 hours and 45 minutes |
| Temperature Keeping Time for Keeping Temperature within 17.5° C.-22.5° C. | 44 hours and 00 minutes | 45 hours and 00 minutes | 29 hours and 30 minutes | 50 hours and 25 minutes | 12 hours and 40 minutes |

TABLE 16

| Temperature in Container Under 35° C. Environment | Heat Storage Material 1 Lauryl Alcohol (a) Octadecane (b) | Heat Storage Material 2 Lauryl Alcohol (c) Octadecane (b) | Heat Storage Material 3 Lauryl Alcohol (a) | Heat Storage Material 4 Lauryl Alcohol (c) | Heat Storage Material 5 PEG (Melting Point of 20° C.) |
|---|---|---|---|---|---|
| Temperature Keeping Time for Keeping Temperature within 15° C.-25° C. | 162 hours and 15 minutes | 152 hours and 00 minutes | 153 hours and 15 minutes | 157 hours and 50 minutes | 91 hours and 45 minutes |
| Temperature Keeping Time for Keeping Temperature within 17.5° C.-22.5° C. | 127 hours and 55 minutes | 120 hours and 05 minutes | 17 hours and 15 minutes | 20 hours and 40 minutes | 45 hours and 45 minutes |

From Tables 15 and 16 and FIGS. 43, 44, 47 and 48, it is revealed that the transport containers using the heat storage materials 1 and 2 according to Examples 17 and 18 have extremely superior temperature keeping times for keeping the transport container within the management temperature range (5° C.±3° C. or 4° C.±2° C.) in comparison with that of the transport container using the heat storage material 6 according to Comparative Example 4. Therefore, it is understood that the heat storage material containing the heat storage material composition according to the present invention and the transport container with these heat storage materials can keep the temperature within the management temperature range for a longer time than the conventional PEG type heat storage materials so as to stably maintain the temperature of the temperature-regulation required articles within a narrow range for a long time. Furthermore, from comparison of the transport containers using the heat storage materials 1 and 2 according to Examples 17 and 18 with the transport containers using the heat storage materials 4 and 5 according to Comparative Examples 2 and 3 with reference to Tables 15 and 16 and FIGS. 43, 45, 46, 47, 49 and 50, it is revealed that the temperature keeping times of these transport containers are substantially the same with each other in the management temperature range of 20° C.±5° C. or 20° C.±2.5° C. under the −20° C. environment and in the management temperature range of 20° C.±5° C. under the 35° C. environment. However, it is also revealed that the temperature keeping times in the management temperature range of 20° C.±2.5° C. under the 35° C. environment of the transport containers using the heat storage materials 4 and 5 are extremely shorter than that of the transport containers using the heat storage materials 1 and 2. Therefore, it is understood that the heat storage materials containing the heat storage material compositions according to the present invention and the transport container with these heat storage materials are specifically suitable for transportation under strict temperature management around 20° C. Also, it is revealed, from graphs shown in FIGS. 43 and 47, that Examples 17 and 18 using the heat storage material compositions obtained by mixing lauryl alcohols produced in different production lots and octadecane, respectively, show substantially the same time-dependent changes in temperature and thus there is little variation of effects there between. Whereas, from a graph shown in FIG. 46, it is revealed that Comparative Examples 2 and 3 using the heat storage material compositions obtained by using lauryl alcohols produced in different production lots alone, respectively, show different time-dependent changes in temperature and thus there are great variations in temperature changes between the production lots. As a result it is understood that the heat storage materials containing the heat storage material compositions according to the present invention and the transport container with these heat storage materials are unaffected from the difference in behavers with respect to temperature changes between the production lots of the raw material of the composition and thus have stable effects.

Furthermore, it is revealed, from Tables 17 and 18 and FIGS. 51 and 52, that the transport containers using the heat storage material 3 according to Example 19 have extremely superior temperature keeping times for keeping the transport containers within the management temperature range (5° C.±3° C. or 4° C.±2° C.) in comparison with that of the transport containers using the heat storage material 7 according to Comparative Example 5. Therefore, it is understood that the heat storage materials containing the heat storage material compositions according to the present invention and the transport containers with these heat storage materials can keep the temperatures within the management temperature range for a longer time than the conventional PEG type heat storage materials so as to stably maintain the temperature of the temperature-regulation required articles within a narrow range for a long time. As a result, the heat storage material containing the heat storage material composition according to the present invention and the transport container are specifically suitable for transportation under strict temperature management around 5° C.

Each element of the aforementioned embodiments and Examples is not limited to the combinations in each embodiment and Example, but each element can be appropriately combined.

Many widely different embodiments and Examples of the present invention may be constructed without departing from the spirit and scope of the present invention. It should be understood that the present invention is not limited to the specific embodiments and Examples described in the specification, except as defined in the appended claims.

INDUSTRIAL APPLICABILITY

The present invention is applicable not only to a technique associated with drug medicine and food, and a medical technology, but also to every field requiring transportation and management with keeping temperature in a range from melting temperature of the water to room temperature and also in a range of body temperature.

DENOTATION OF REFERENCE NUMERALS

1 transport container
10 heat storage material
40 insulation container
41 insulation box
410 opening
411 bottom surface
412 side surface
42 cover
5 space for accommodating temperature-regulation required articles
6 spacer

The invention claimed is:
1. A heat storage material composition, comprising 90-98 wt % mixture of lauryl alcohol and n-octadecane; and 2-10 wt % of hydroxypropyl cellulose,
  wherein a molar fraction of the lauryl alcohol relative to the mixture of lauryl alcohol and n-octadecane is 65-89 mol %,
  wherein the heat storage material composition is in a coagulation state, and
  wherein the heat storage material composition has a single melting peak in a differential scanning calorimeter (DSC) curve in a temperature range of −10 to 50° C., the single melting peak constituting at least 90% of the area in the DSC curve.
2. The heat storage material composition according to claim 1, wherein the molar fraction of the lauryl alcohol relative to the mixture of lauryl alcohol and n-octadecane is 70-85 mol %.
3. The heat storage material composition according to claim 1, wherein the hydroxypropyl cellulose is 3-7 wt % of the heat storage material composition.
4. A heat storage material comprising said heat storage material composition according to claim 1.

5. A transport container comprising an insulation box and said heat storage material according to claim 4, arranged in said insulation box.

6. A heat storage material composition, consisting essentially of a mixture of lauryl alcohol and n-octadecane; and 2-10 wt % of hydroxypropyl cellulose,
- wherein a molar fraction of the lauryl alcohol relative to the mixture of lauryl alcohol and n-octadecane is 65-89 mol %,
- wherein the heat storage material composition is in a coagulation state, and
- wherein the heat storage material composition has a single melting peak in a differential scanning calorimeter (DSC) curve in a temperature range of −10 to 50° C., the single melting peak constituting at least 90% of the area in the DSC curve.

7. The heat storage material composition according to claim 6, wherein the molar fraction of the lauryl alcohol relative to the mixture of lauryl alcohol and n-octadecane is 70-85 mol %.

8. The heat storage material composition according to claim 6, wherein the hydroxypropyl cellulose is 3-7 wt % of the heat storage material composition.

9. A heat storage material comprising said heat storage material composition according to claim 6.

10. A transport container comprising an insulation box and said heat storage material according to claim 9, arranged in said insulation box.

* * * * *